Figure 1:
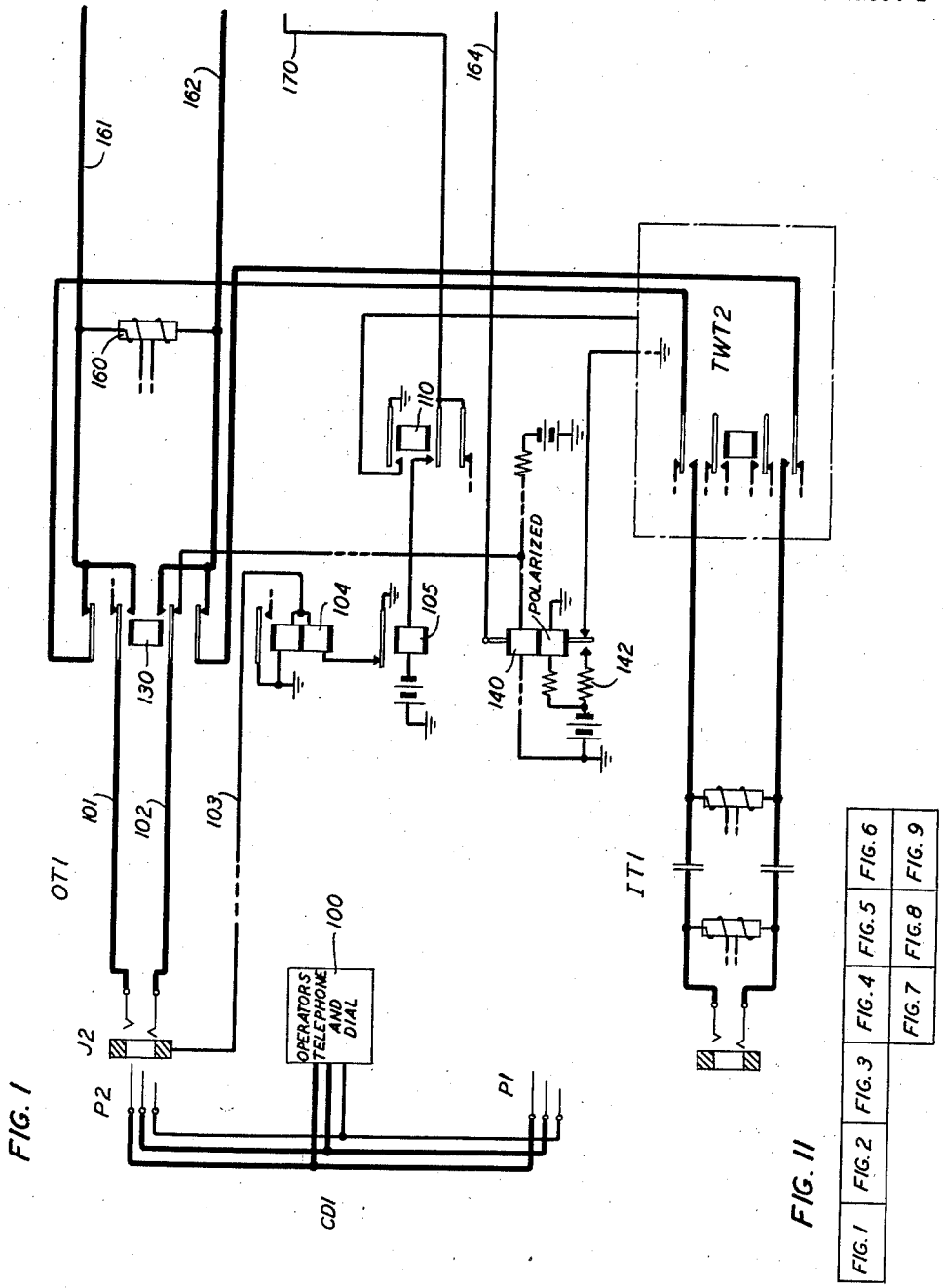

Nov. 17, 1942.  E. R. TAYLOR  2,302,071
SIGNALING SYSTEM
Filed April 23, 1941  10 Sheets-Sheet 4

INVENTOR
E. R. TAYLOR
BY
R. O. Covell
ATTORNEY

Nov. 17, 1942.    E. R. TAYLOR    2,302,071
SIGNALING SYSTEM
Filed April 23, 1941    10 Sheets-Sheet 8

INVENTOR
E. R. TAYLOR
BY
R. O. Covell
ATTORNEY

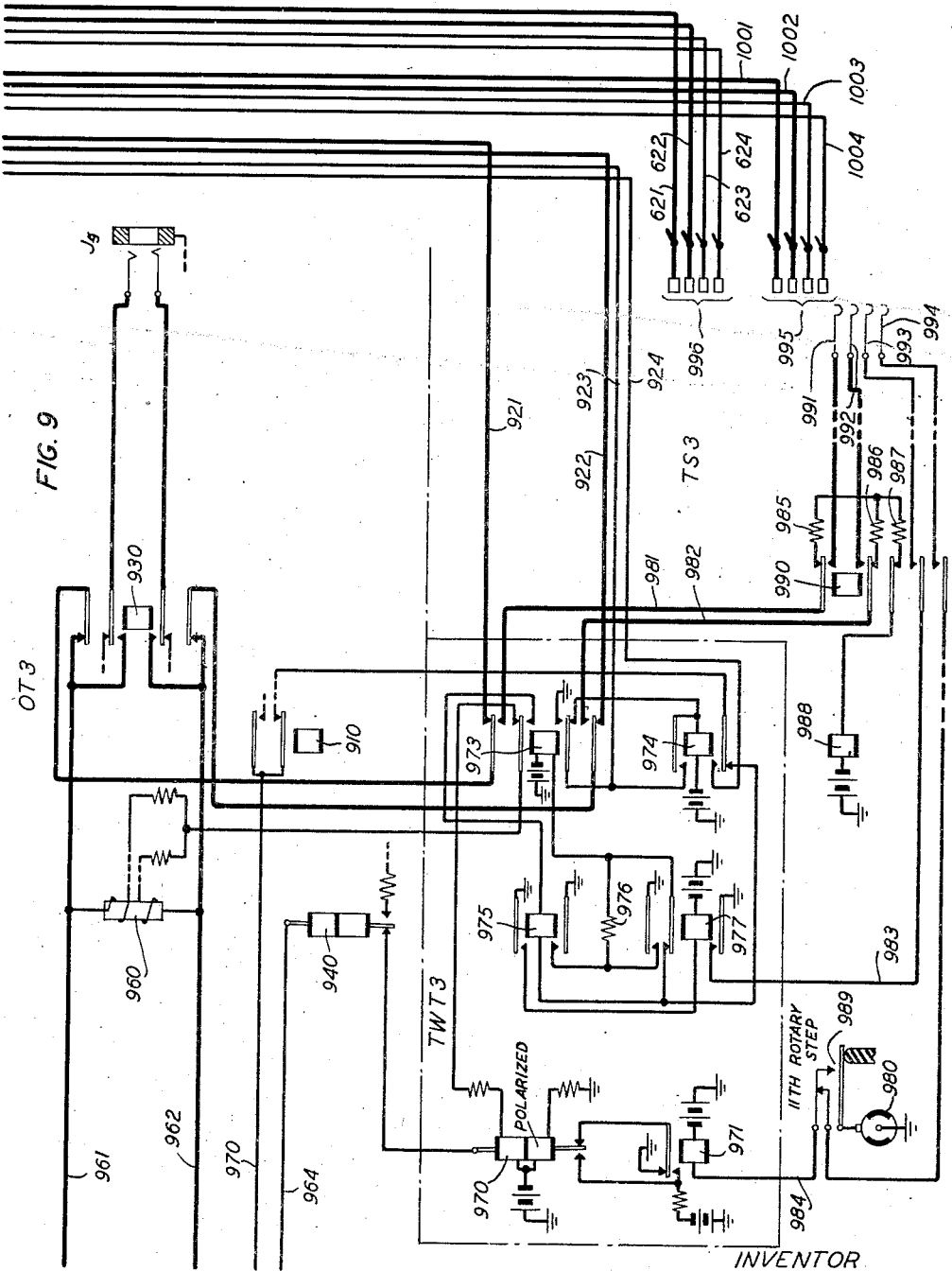

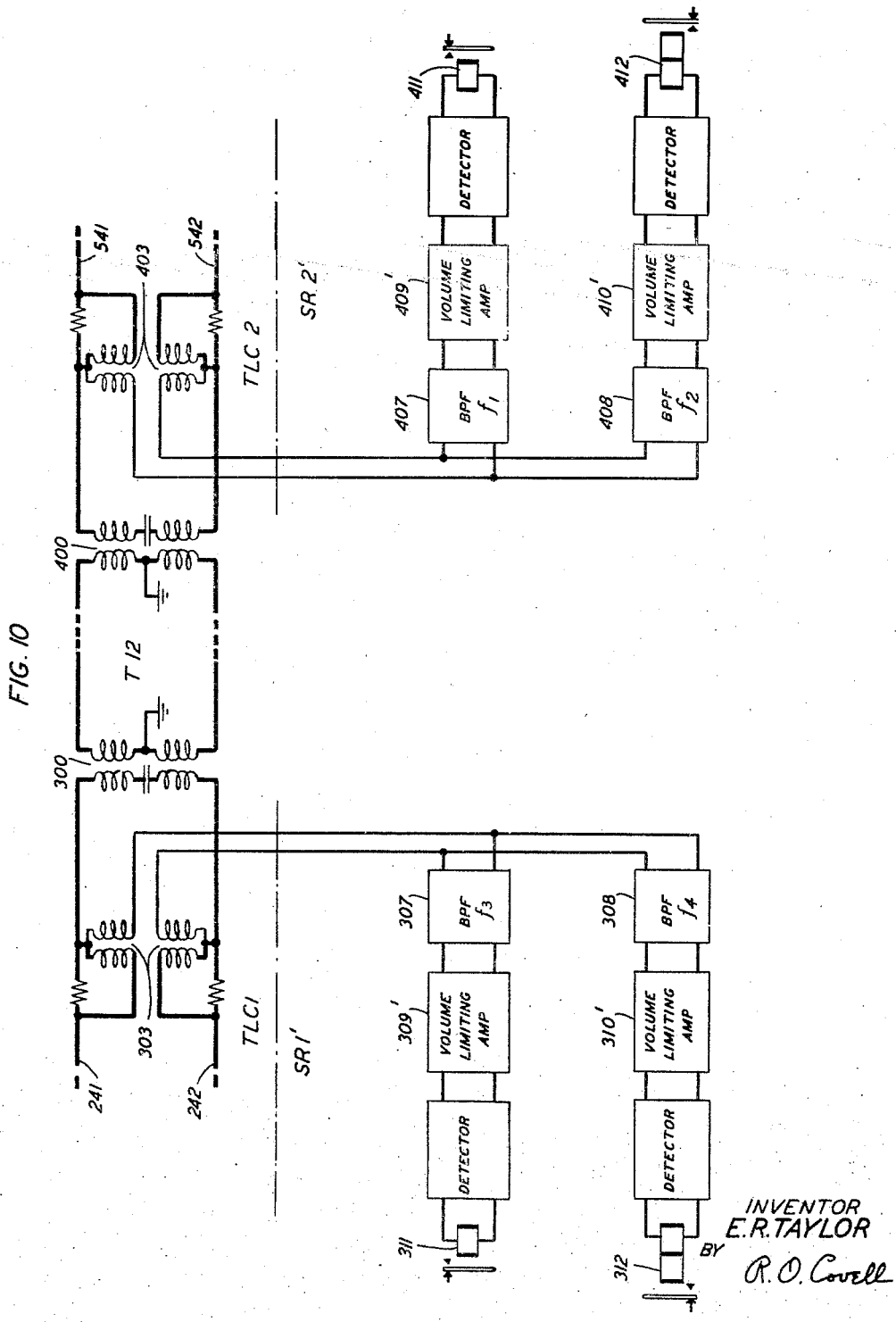

Patented Nov. 17, 1942

2,302,071

UNITED STATES PATENT OFFICE 2,302,071

SIGNALING SYSTEM

Edmund R. Taylor, Mount Vernon, N. Y., assignor to Bell Telephone Laboratories, Incorporated, New York, N. Y., a corporation of New York Application April 23, 1941, Serial No. 389,836

30 Claims. (Cl. 179—27)

This invention relates to signaling systems and particularly to telephone systems in which voice frequency currents are used for transmitting signals.

Objects of the invention are the provision of more reliable signal transmitting and receiving means in systems employing voice frequency signaling, the provision of a voice frequency signal receiver adapted to quickly respond to seizure of the toll line with which the receiver is associated, and the prevention of false operations in response to voice currents or other interfering currents.

This invention is an improved signaling system comprising means for transmitting signals comprising current of a first frequency followed by current of a second frequency and signals comprising current of the second frequency followed by current of the first frequency, and arranged to respond to such signals without responding to voice currents or other interfering currents. Similar signal transmitting and receiving means are connected to each end of a toll telephone line, different pairs of frequencies being used for signaling in each direction thereover.

According to one feature of the invention, the signal receiver is arranged to recognize current of one of two signaling frequencies as a seizure signal to effect a busy marking of the toll line without waiting for current of the other of the two frequencies and thereafter to effect a signal response in response to current of either of the two frequencies only when immediately preceded by current of the other of the two frequencies.

According to another feature of the invention, a disconnect signal comprises current of the second of the signaling frequencies followed by current of the first of the two frequencies, the signal transmitter being arranged to repeat this signal to make certain that release of an established connection is effected. The signal receiver is arranged to effect release in response to the first of the two disconnect signals received over the line with which the receiver is associated. If the signal receiver fails to recognize the first disconnect signal, due for instance to interference currents in the line, it may recognize the second of the two disconnect signals. In either case, the busy marking of the toll line with which the signal transmitter and receiver are associated is maintained at both ends of the toll line until the second disconnect signal is ended.

A further feature of the invention is the provision of means in a signal receiver adapted to respond to signals consisting of a sequence of currents of two different frequencies for preventing a signal response until the current of the second of the two frequencies has continued for a predetermined interval of time, thereby preventing a signal operation in response to signaling currents transmitted through the talking connection in a tandem office on connections between two lines arranged for transmitting voice frequency signals of similar character.

A further feature of the invention is the provision of separate volume limiting amplifiers in a signal receiver adapted to respond to signals consisting of a sequence of currents of two different frequencies, one for each frequency, to limit the current applied to each of the signaling relays independent of variations of the signaling current over the line, thereby reducing signal distortion. Band-pass filters are inserted between the amplifiers and the line, one for each frequency, so as to reduce the possibility of operation of the signal relays by voice and noise currents; and the limiters are of the slow recovery type so as to prevent echoes of the first frequency from interfering with the release of the relay responsive to the first current impulse of a signal and operation of the relay responsive to the second current impulse of the signal.

A clear and complete understanding of the invention will be facilitated by considering a system embodying the invention and its various features, one such system being represented schematically in the drawings which form a part of this specification. The invention is not limited in its application to the particular system and circuit arrangements shown in the drawings but is applicable, generally, to any voice frequency signaling or telephone system.

Figure 2:
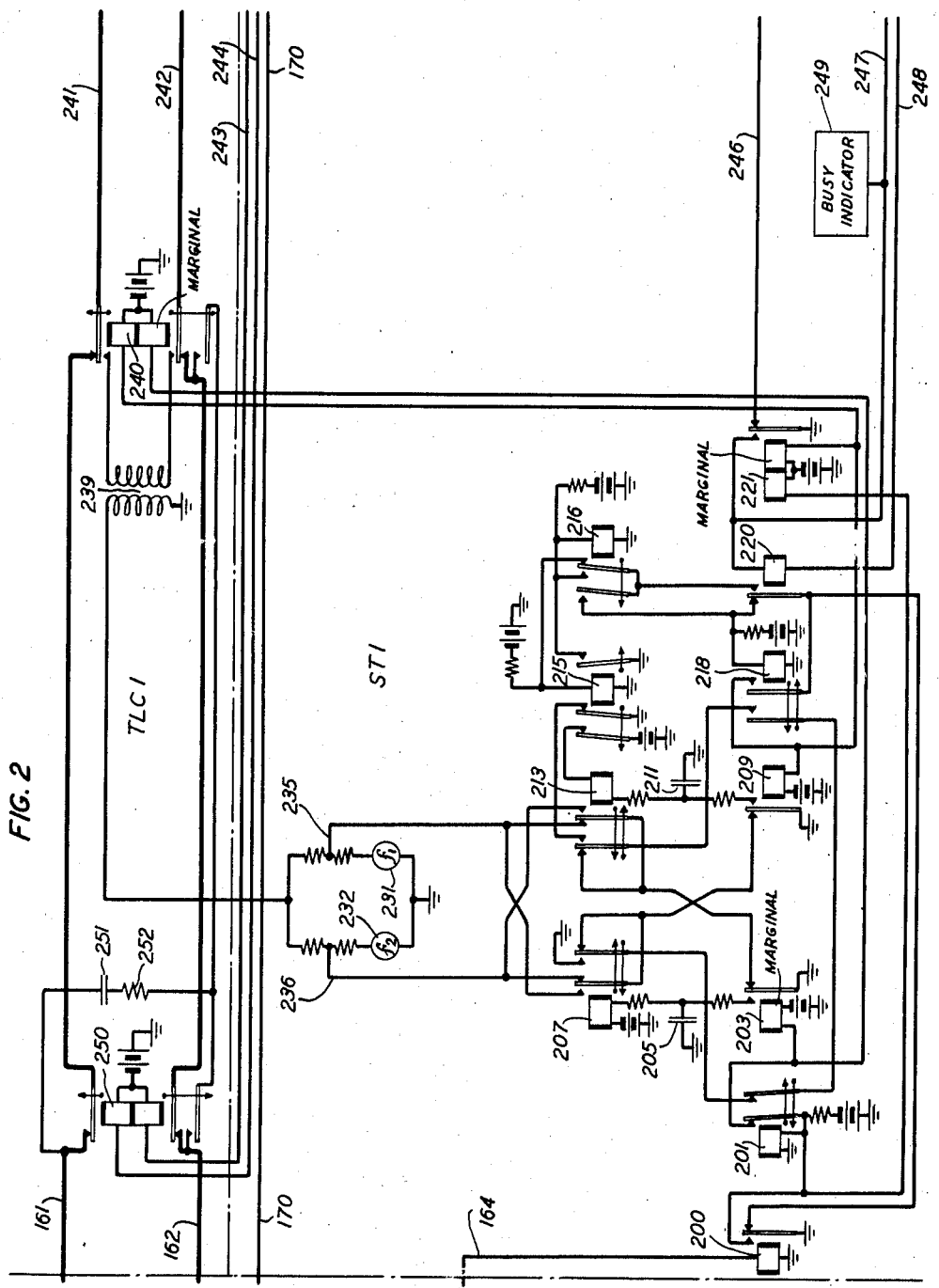
Figure 3:
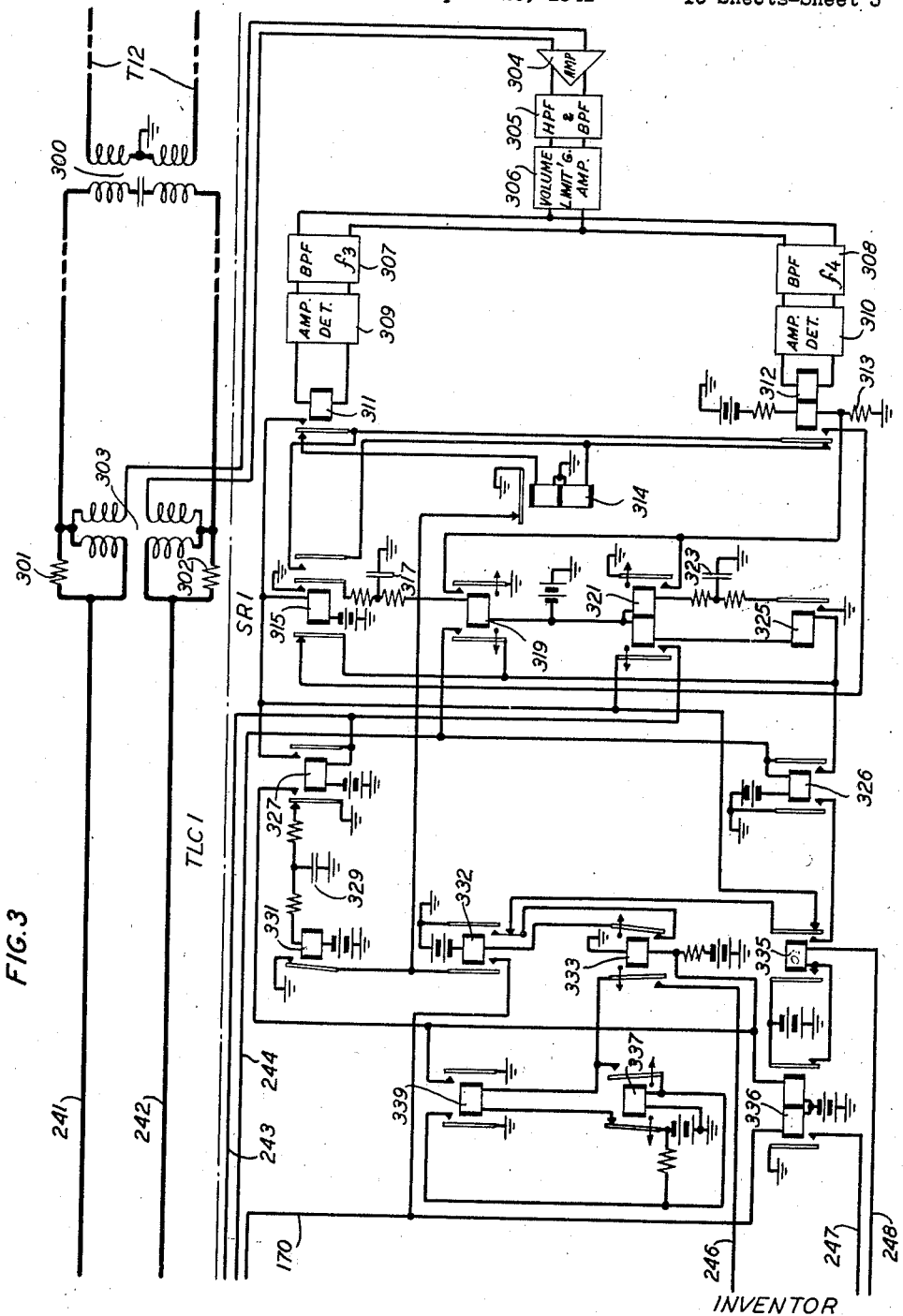
Figure 4:
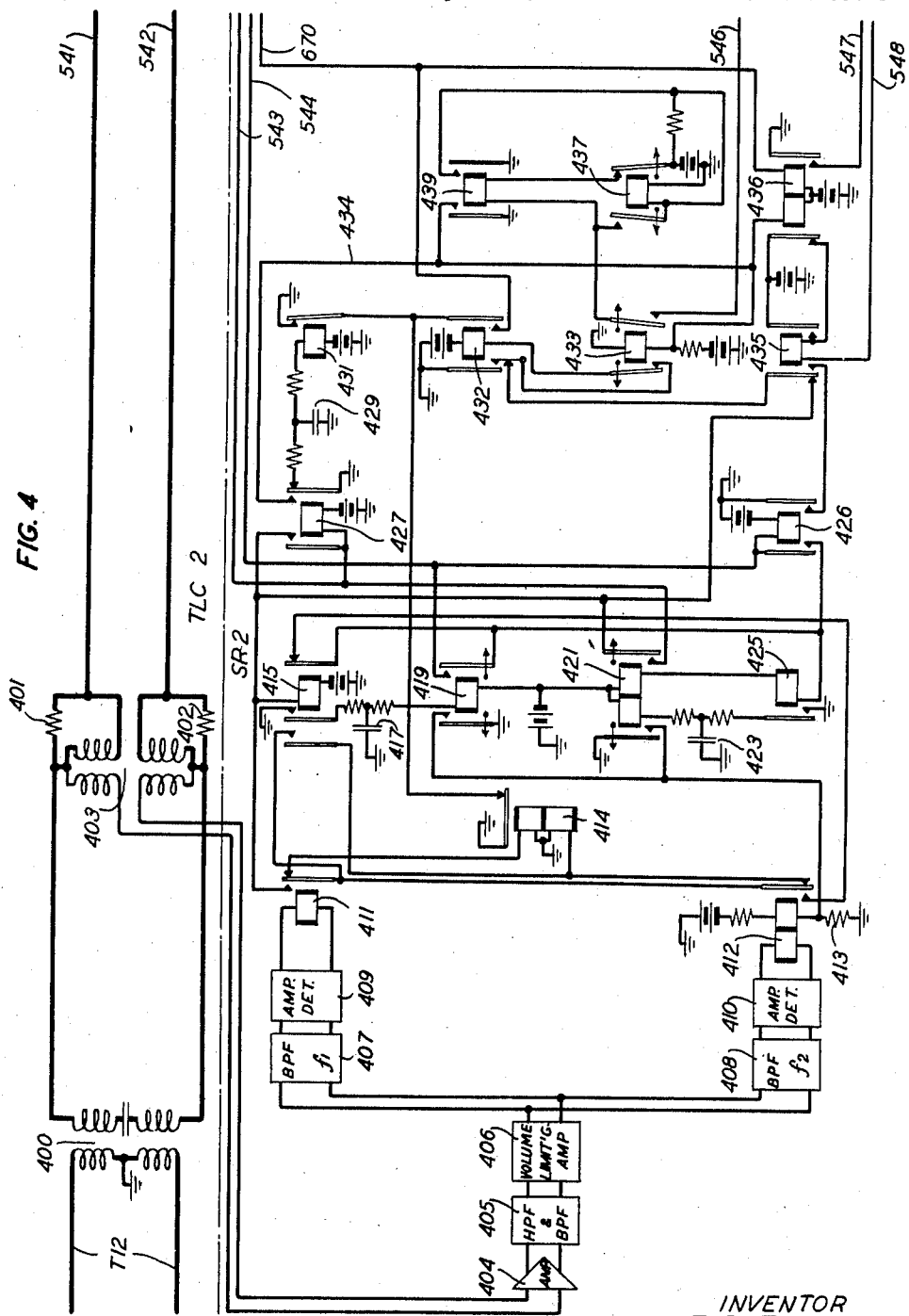
Figure 5:
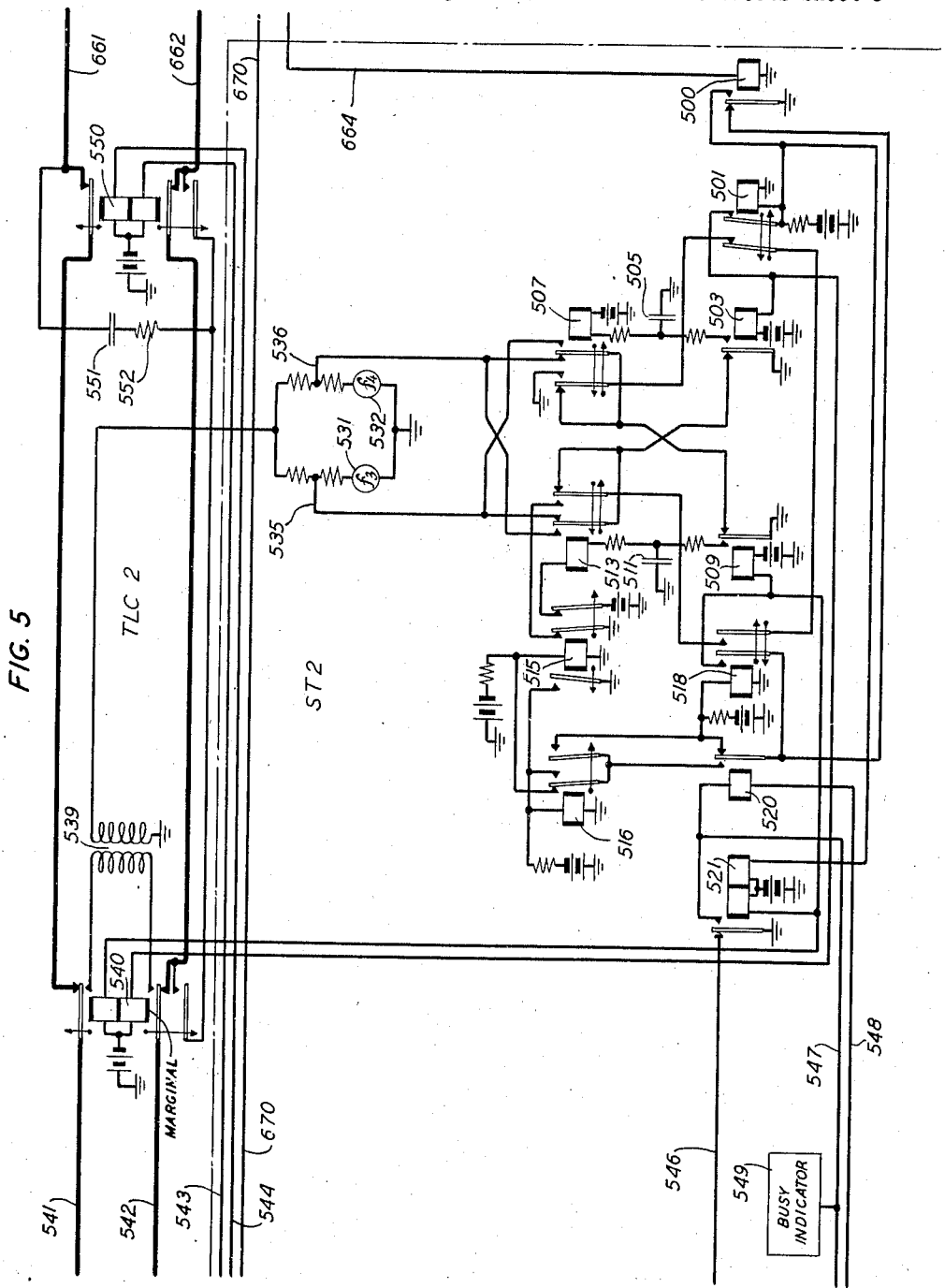
Figure 6:
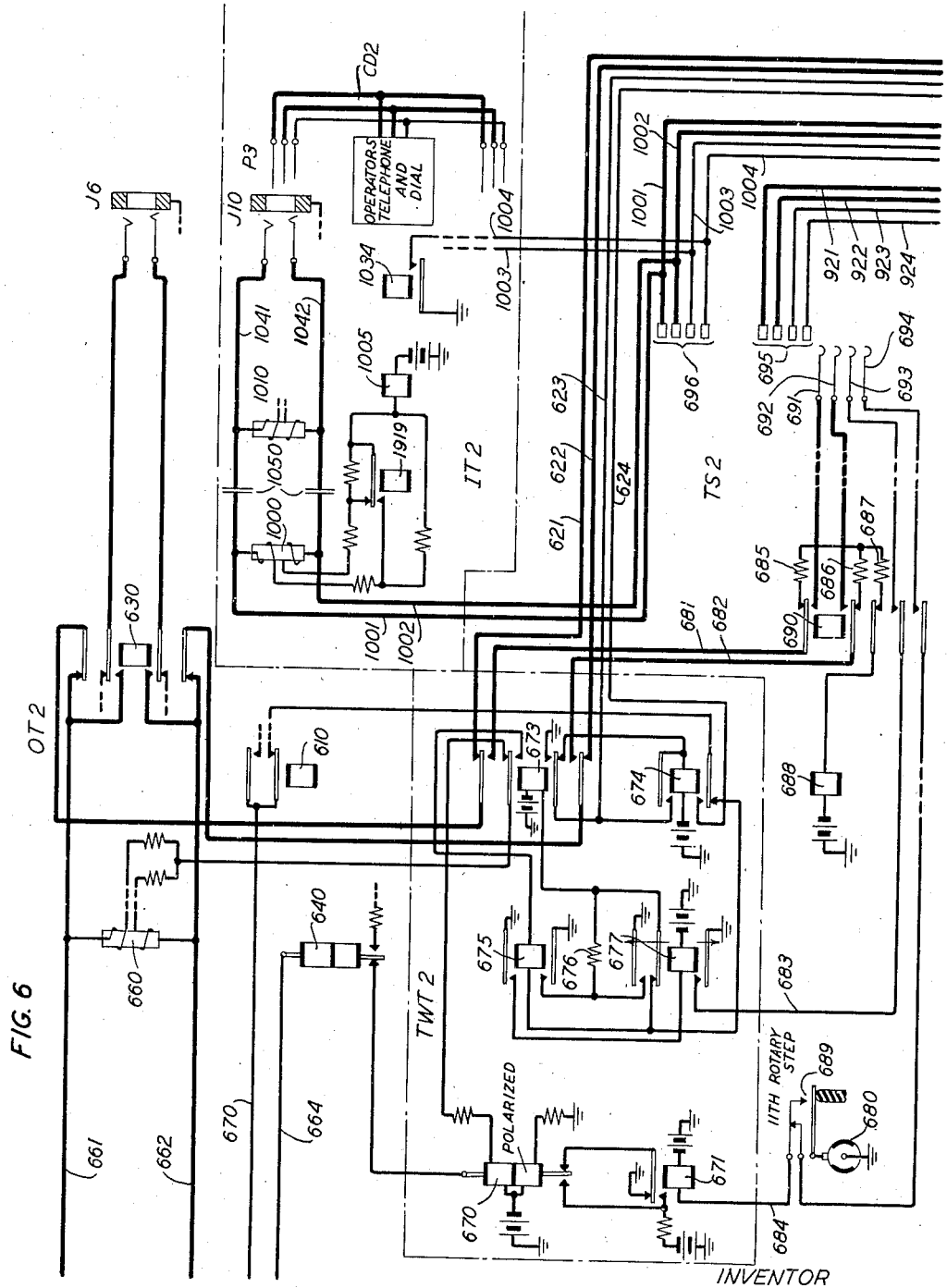
Figure 7:
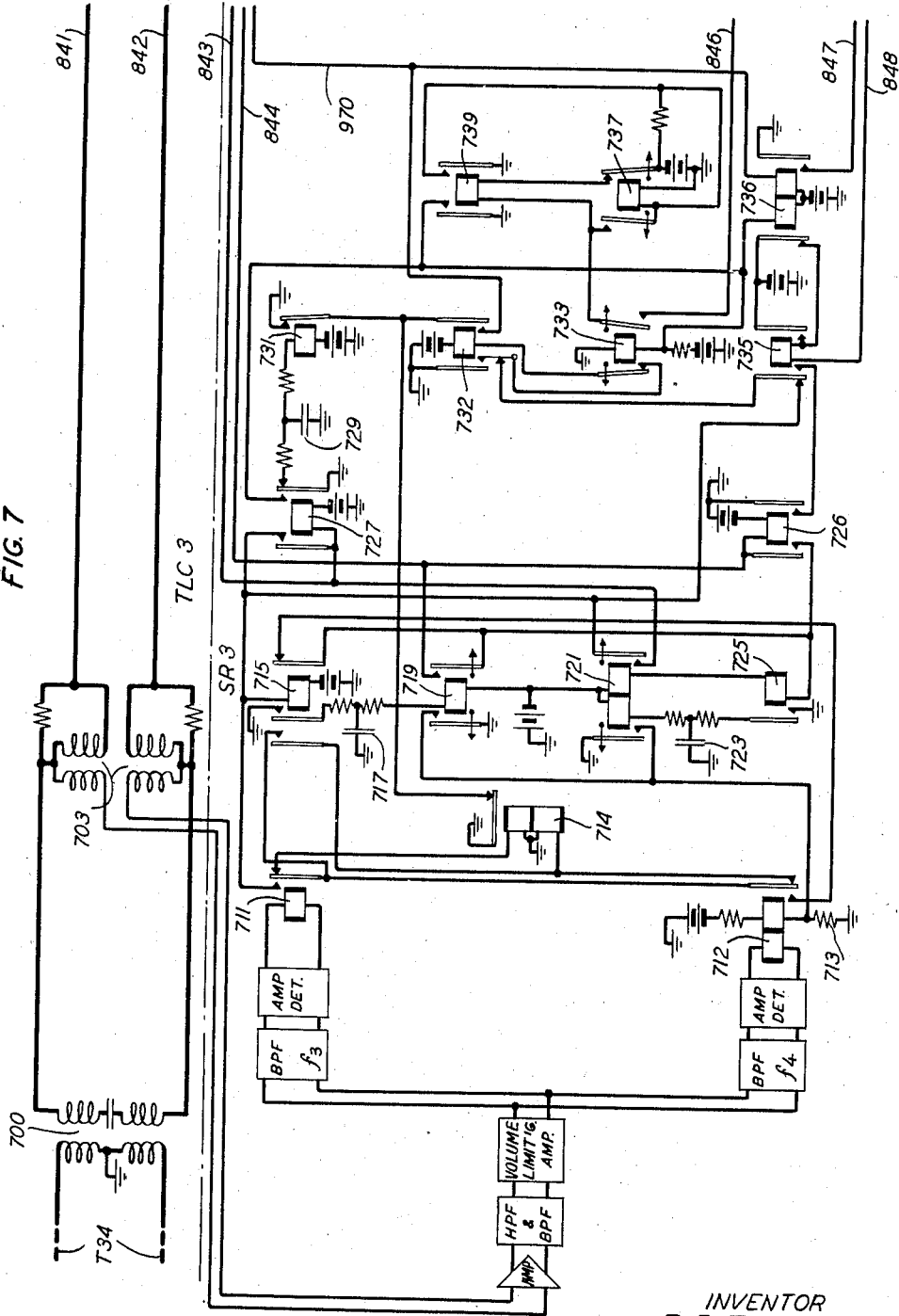
Figure 8:
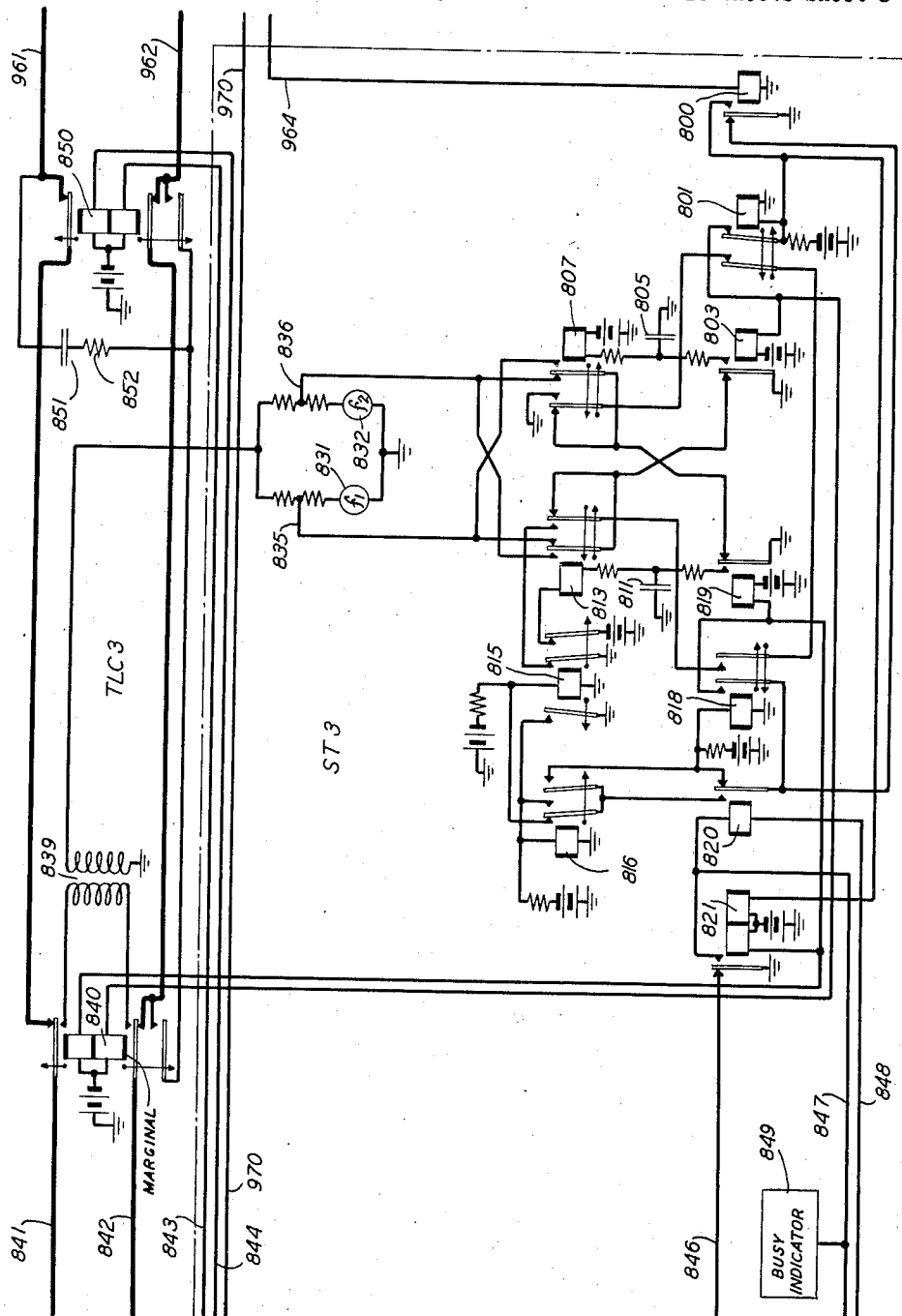

Referring to the drawings:

Figs. 1 to 3, inclusive, show in a first toll office an outgoing trunk circuit OT1, a two-way trunk circuit TWT2, an incoming trunk circuit IT1, a toll line circuit TLC1, a signal transmitter ST1, and a signal receiver SR1 all associated with a toll line T12;

Figs. 4 to 6, inclusive, show in a tandem toll office a toll line circuit TLC2, signal receiver SR2, signal transmitter ST2, two-way trunk circuit TWT2, outgoing trunk circuit OT2, and a selector TS2, all associated with toll line T12, and show an incoming trunk circuit IT2;

Figs. 7 to 9, inclusive, show a toll line circuit TLC3, signal receiver SR3, signal transmitter ST3;

two-way trunk circuit TWT3, outgoing trunk circuit OT3 and selector TS3 all associated with a toll line T34;

Fig. 10 shows signal receivers SR1′ and SR2′ connected to the ends of toll line T12, each of the signal receivers SR1′ and SR2′ being modifications of the signal receivers SR1 and SR2 of Figs. 3 and 4; and Fig. 11 shows the relative position in which Figs. 1 to 9, inclusive, are to be placed to form an operative arrangement.

Reference may be had to the patent to R. E. King et al. No. 2,209,777, granted July 30, 1940, for a detailed disclosure of the cord and operator's position circuits provided in each of the toll offices for interconnecting and controlling the completion of toll calls. The outgoing trunk circuits OT1, OT2 and OT3, incoming trunk circuits IT1 and IT2, two-way trunk circuits TWT1, TWT2 and TWT3 and the toll route selector circuits TS2 and TS3 are all similar to corresponding circuits in the aforementioned King et al. patent and also to corresponding circuits of the copending application of J. G. Walsh, Ser. No. 389,835, filed April 23, 1941. The toll line circuits TLC1, TLC2 and TLC3 and the associated signal transmitting and receiving circuits ST1, ST2, ST3, SR1, SR2 and SR3 are arranged for voice frequency signaling over the associated toll lines; whereas in the aforementioned King et al. patent composite signaling circuits are associated with the toll lines.

The toll line circuit TLC1 comprises a repeating coil 300, a directionally selective coil 303, a sending cut-off relay 240 for disconnecting the talking conductors 161 and 162 of the associated trunk circuits from coil 300 when signals are being transmitted over line T12 to the tandem office, a repeater termination consisting of condenser 251 and resistor 252 for connection across the talking conductors while signals are being transmitted to or received from the tandem office, a transformer 239 for impressing the signaling potentials across conductors 241 and 242, and a receiving cut-off relay 250 for disconnecting the talking conductors 161 and 162 from coil 300 while signals are incoming over line T12 from the tandem office. Signaling currents incoming over toll line T12 pass through the directionally selective coil 303 to the signal receiver SR1. Signaling currents outgoing over toll line T12 from transmitter ST1 also pass through coil 303, the coil and associated resistors 301 and 302 preventing any substantial portion of the signaling currents outgoing from transmitter ST1 from passing into the signal receiver SR1. Each of the toll line circuits TLC2 and TLC3 is similar to the line circuit TLC1, the reference characters of like elements having the same tens and units digits.

The signal transmitter ST1 comprises a relay 200 which receives direct current signals which are to be converted into voice frequency signals for transmission over line T12, relays 201, 203, 207, 209, 213, 215, 216 and 218 for effecting the transmission of signals consisting of an impulse of current of frequency f1 followed by current of frequency f2 and signals consisting of current frequency f2 followed by current of frequency f1. The transmitter ST1 further comprises sources of signaling current 231 and 232, a transformer or repeating coil 239, busy relays 220 and 221, and various resistors and condensers. A seizure signal sent by transmitter ST1 on an outgoing call and an answering supervisory or OFF-HOOK signal sent by transmitter ST1 on an incoming call consist of current of frequency f1 for about .020 second followed by current of frequency f2 for about .100 second; dial impulses consist of current of frequency f2 for about .030 second followed by current of frequency f1 for the duration of the impulse; an ON-HOOK signal and a rering signal are each similar to a single dial impulse; and a disconnect signal sent by transmitter ST1 consists of current of frequency f2 for about .020 second followed successively by current of frequency f1 for about .600 second, current of frequency f2 for about .100 second, and current of frequency f1 for about 1.3 seconds. Each of the signal transmitters ST2 and ST3 is similar to the transmitter ST1, the reference characters of like elements having the same tens and units digits. Since different frequencies are used for signaling in opposite directions, the sources 231 and 232 of transmitter ST1 generate frequencies f1 and f2, respectively, and the sources 531 and 532 of transmitter ST2 generate frequencies f3 and f4, respectively. For instance, frequencies 680 cycles and 1615 cycles may be used for transmitting signals over toll line T12 to the tandem office and frequencies 850 cycles and 1870 cycles may be used for transmitting signals outgoing over toll line T12 from the tandem office. The frequencies used for signaling over toll line T34 may be similar to or different from the frequencies used for signaling over line T12. As shown in Fig. 8, the sources 831 and 832 of transmitter ST3 also generate potentials of frequencies f1 and f2, respectively.

The signal receiver SR1 comprises an amplifier 304, a filter 305 for attenuating noise, local plant tones and the signaling frequencies f1 and f2 used for transmitting signals outgoing over toll line T12, a volume limiting amplifier 306, a filter 307 tuned to pass current of frequency f3, a filter 308 tuned to pass current of frequency f4, amplifier detectors 309 and 310 and signal relays 311 and 312 for responding to signaling current of frequencies f3 and f4, respectively. The output of the volume limiter 306 is somewhat in excess of the current needed for operating each of relays 311 and 312 but is insufficient to effect the operation of either of these relays unless substantially all of the current is of frequency f3 or substantially all of frequency f4. Although the directionally selective coil 303 allows only a small portion of the signal energy from transmitter ST1 to reach the signal receiver SR1, further protection against response to outgoing signaling currents is provided by elements of filter 305 tuned to attenuate the energy of frequencies f1 and f2. Relays 314, 315, 319, 321, 325, 326, 327, 331, 332, 333, 335, 336, 337 and 339 are controlled by relays 311 and 312 to effect desired closures and openings of a direct current signaling circuit over conductor 170 in response to incoming signals consisting of current of frequency f3 followed by current of frequency f4 or consisting of current of frequency f4 followed by current of frequency f3. Each of the signal receiving circuits SR4 and SR3 is similar to the receiver SR1, the reference characters of like elements having the same tens and units digits. The receiver SR2 is arranged to respond only to signals consisting of current of frequency f1 followed by current of frequency f2 or to signals consisting of current of frequency f2 followed by current of frequency f1. The signal receiver SR3 is arranged to respond only to signals consisting of current of frequency f3 followed by current of frequency f4 or to signals consisting of current of frequency $f4$ followed by current of frequency $f3$.

Further explanation of the invention will be facilitated by describing in detail the circuit operations involved in calls in both directions over toll line T12. Assume first that an operator in the first toll office inserts the plug P2 of a cord CD1 in jack J2 on a call outgoing over toll line T12. Relay 104 is operated by the connection of battery to the sleeve conductor of jack J2 and relay 140 is operated, as described in the aforementioned patent of R. E. King et al. The operation of relay 140 closes a circuit from battery through resistor 142 and conductor 164 for operating relay 200 of the signal transmitter ST1. Relay 200 opens the normally closed short circuit around relay 218, closes a circuit for operating busy relay 221, closes a short circuit around the winding of relay 201, and closes circuits including the inner front contact of relay 201 and windings of relays 203 and 240. Relay 218 is slow in operating, closing its contacts within .050 second after relay 200 operates. Relay 201 is slow in releasing and remains operated for about .100 second during which interval relays 203 and 240 operate. The operation of relay 221 connects ground to conductor 247 to operate a busy indicator 249 associated with line T12 and closes a circuit for operating relay 229 in series with relay 335 of the signal receiver SR1. Relay 335 also operates and closes a locking circuit which is independent of relay 336. Relay 220 disconnects the winding of relay 218 from the back contact of relay 200 and connects this contact to the winding of the normally operated relay 215. The operation of relay 240 disconnects the talking conductors 161 and 162 of trunk circuit OT1 from conductors 241 and 242 and coil 300, bridges the repeater termination comprising condenser 251 and resistor 252 across conductors 161 and 162, and connects the right winding of transformer 239 to and through conductors 241 and 242 to coil 300. The signaling sources 231 and 232 are normally connected through conductors 235 and 236 and back contacts of relays 207 and 213, to ground at the back contacts of relays 203 and 209, thereby short-circuiting the left winding of coil 239. When relay 203 operates, it disconnects ground from conductor 235 thereby initiating current of frequency $f1$ through the left winding of coil 239 and closes a circuit for energizing the winding of relay 207. Relay 207 is slow in operating; and, during an interval of about .020 second before relay 207 operates, the first part of a seizure signal is transmitted over toll line T12. When relay 207 operates, it connects ground to conductor 235 to end the signaling current of frequency $f1$ and disconnects ground from conductor 236 thereby initiating current of frequency $f2$ through coils 239 and 300 and line T12. When relay 213 closes its contacts, within .050 second after relay 200 operates, it connects the winding of relay 209 to the back contact of relay 200 and connects ground at the outer front contact of relay 207, through front contacts of relays 201 and 213, and through both back contacts of relay 213 to conductor 235, in parallel with the path to ground at the back contact of relay 209. When relay 201 releases, about .1 second after relay 200 operates, the operating circuits of relays 203 and 240 are opened. The release of relay 203 opens the operating circuit of relay 207 and connects ground through its back contact and inner back contact of relay 213 to conductor 235 to prevent current of frequency $f1$ in coil 239 after relay 207 releases. Relay 207 is held operated, for an interval of about .020 second after relay 203 releases, by current charging condenser 205. Relay 240 being slow in releasing, its contacts are not restored to normal for about .020 second after relay 201 releases. The release of relay 207 reconnects conductor 236 to ground at the back contact of relay 209; and the release of relay 240 disconnects coil 239 from, and reconnects talking conductors 161 and 162 to, coil 300 and line T12. Thus the current of frequency $f2$ in coil 300 and line T12 continues for about .1 second, that is, until relay 207 releases, or until relay 240 releases if relay 240 releases before relay 207 releases.

The seizure signal, thus transmitted over line T12 to the signal receiver SR2 in the tandem office, is passed through coil 400, the left windings of directionally selective coil 403, amplifier 404, and filter 405 to volume limiting amplifier 406. The energy of frequency $f1$ is further transmitted through filter 407 and amplifier detector 409 to energize the winding of relay 411; and the energy of frequency $f2$ is transmitted through filter 408 and amplifier detector 410 to energize the left, operating winding of relay 412. The amplitude of the output of amplifier 406 is limited to a value sufficient for operating relay 411 only when substantially all of the current is of frequency $f1$ and for operating relay 412 only when substantially all of the current is of frequency $f2$. Thus relays 411 and 412 will be operated in succession in response to a seizure signal; but these relays will seldom or never operate in response to noise, voice or other interfering currents having a component of frequency $f1$ or frequency $f2$. The operation of relay 411 closes circuits including the lower winding of relay 414, back contact of relay 412 and front contact of relay 411 for operating relays 414, 415 and 432. Relay 432 locks under control of relay 433, closes a circuit from ground at the front contact of relay 431, through the right front contact of relay 432, for operatively energizing the right winding of relay 436, and connects the ground at the front contact of relay 431 to conductor 670 as a seizure signal. The operation of relay 436 disconnects battery from the winding of relay 435, to prevent the operation of battery 435 in series with relay 520 of transmitter ST2, and connects ground to conductor 547 to operate a busy indicator 549 associated with the line T12. The closing of the outer left-hand contact of relay 415 renders the continued operation of this relay independent of relay 412; and the opening of the back contact of relay 415 prevents the operation of relays 421 and 425 while relay 415 is operated. Relay 415 closes a circuit for operating the slow-to-release relay 419. Relay 419 short-circuits resistor 413 to increase the current through the biasing winding of relay 412. Relays 411, 415 and 419 release in succession when the signaling current of frequency $f1$ ends, but relay 419 is held operated by current charging condenser 417 for a predetermined interval of time, for instance .020 second, after relay 415 releases. The operation of relay 412, in response to the signaling current of frequency $f2$, closes circuits including the upper winding of relay 414, back contact of relay 411, front contact of relay 412, back contact of relay 415 and the windings of relays 425 and 421 for operatively energizing each of these windings; and, since relay 412 operates before relay 419 has released, relay 412 also closes circuits including the upper winding of relay 414, back contact of relay 415 and right front contact of relay 419 for operatively energizing the winding of relay 426 and the upper winding of cut-off relay 550 of the associated toll line circuit TLC2. At its left contact, relay 421 short-circuits resistor 413; and, at its right contact, relay 421 connects the winding of relay 427 and the lower winding of relay 550 in parallel with the winding of relay 415. Relay 425 closes a circuit for operatively energizing the left winding of relay 421. Relay 426 closes a holding circuit for its winding in parallel with the upper winding of relay 550 so that these relays remain operated, after relay 419 releases, until relay 412 releases. Relay 550 disconnects the talking conductors 661 and 662 from coil 400 and bridges the repeater termination consisting of condenser 551 and resistor 552 across these conductors. When the signaling current of frequency $f2$ ends, relay 412 releases, causing the release of relays 425, 426, 421 and 550. Relays 421 and 550 are slow in releasing, the left winding of relay 421 being operatively energized for about .020 second by current charging condenser 423 after relay 425 releases. The release of relay 421 disconnects the winding of relay 427 and lower winding of relay 550 from the front contact of relay 411; and the release of relay 550 reconnects line T12 and coil 400 to talking conductors 661 and 662.

The aforementioned operation of relay 432, in response to the first part of the seizure signal, that is, upon operation of relay 411 in response to the impulse of current of frequency $f1$, connects ground at the front contact of the normally operated relay 431, through conductor 670, a back contact of relay 610 of outgoing trunk circuit OT2, back contacts of relays 674 and 677 of the two-way trunk circuit TWT2 to the winding of relay 673. Relay 673 operates, connecting ground to conductor 623 to mark the line T12 busy in the banks of selectors having access thereto. Thus the operation of relays 411, 432 and 673 in response to the current of frequency $f1$ is effective to mark the toll line T12 busy in the tandem office without waiting for the current of frequency $f2$, thereby reducing the time interval after seizure at one end before it is protected against seizure at the other end. Relay 673 closes a circuit for operating relay 675 in series with line relay 688 of the associated toll selector TS2; this circuit is traced from ground at the back contact of relay 431 of signal receiver SR2, right front contact of relay 432, conductor 670, back contacts of relays 610 and 674, winding of relay 675, inner upper front contact of relay 673, thence in simplex through the windings of retard coil 660 of outgoing trunk circuit OT2, outer back contacts of relay 630, outer front contacts of relay 673, conductors 681 and 682, back contacts of relay 699 of selector circuit TS2, through resistors 685 and 686 to resistors 687, thence through a back contact of relay 690 to the winding of relay 688. Relay 675 closes a circuit through resistor 676 for holding relay 673 and closes a circuit for operating the slow-to-release relay 677. Relay 677 closes a holding circuit for relay 673 and connects ground to conductor 683 to hold the succeeding circuit units through which the desired connection is extended in the tandem office until release is effected as hereinafter described.

When the calling operator operates the dial key (not shown) and dials the toll route number, and also the called local office and subscriber's number in case the called line is located in an office in which dial controlled selectors are provided for completing desired connections, relay 140 is alternately released and reoperated under control of the dial (not shown), the dialing circuit including conductor 102 and the upper winding of relay 140. The release and reoperation of relay 140 in response to each dial impulse causes a like release and reoperation of relay 200. The release of relay 200 in response to the first impulse of each digit dialed, causes the operation of relay 209, short-circuits the winding of normally operated relay 215 and opens the short circuit across the winding of relay 201. Since relay 215 is slow in releasing, it does not release during the response of relay 200 to dial impulses. Relay 221 is held operated by its right winding and relay 240 is operated by its upper winding, both of which windings are in parallel with the winding of relay 209. The operation of relay 240 connects coil 239 to coil 300 and the operation of relay 209 disconnects ground from conductor 236 thereby starting current of frequency $f2$ through coils 239 and 300, the conductors of line T12 and through coil 400. Relay 201 is slow in operating taking longer to operate than the sum of the intervals of time required for operating relays 209 and 213 but less than the minimum dial impulse. Relay 201 remains operated while all of the impulses in the train are being received and until .1 second after relay 200 reoperates at the end of the last impulse of the train. Relay 209 also closes the circuit for operating the slow-to-operate relay 213. The operation of relay 213, about .020 second after the operation of relay 209, disconnects ground from conductor 235 and connects ground to conductor 236 thereby ending the current of frequency $f2$ and causing current of frequency $f1$ in coils 239 and 300, the conductors of line T12, and coil 400. When relay 200 reoperates at the end of the first dial impulse of a train, relay 209 releases and relay 203 operates. The operation of relay 203 closes the circuit for operating relay 207 and disconnects ground at its back contact from conductor 235; but until relay 207 operates, this conductor is connected through both back contacts of relay 207, front contacts of relays 201, 218 and 213 to ground at a front contact of relay 215. The release of relay 209 also connects ground to conductor 236 and opens the operating circuit of relay 213. The winding of relay 213 remains energized for about .020 to .030 second after relay 209 releases, while condenser 211 is charging, thereby preventing the release of relay 213 before relay 207 operates. When relay 207 operates, it disconnects ground from conductor 236 and connects ground to conductor 235. The connection of ground to conductor 235 ends the current of frequency $f1$ and starts current of frequency $f2$ in coils 237, 300 and 400. When relay 200 again releases at the beginning of the second dial impulse of the train, relay 209 reoperates relay 203 releases. When relay 213 reoperates, about .020 second after relay 209 reoperates, ground is disconnected from conductor 235, and conductor 236 is connected to ground at the back contact of relay 203; and, when relay 207 releases, conductor 236 is also connected through both back contacts of relay 207 and front contacts of relays 201 and 218 to ground at a front contact of relay 215, thereby again initiating current of frequency $f2$ and terminating current of frequency $f2$ through coils 239, 300 and 400. When relay 200 reoperates at the end of the second impulse, relays 203 and 207 operate in succession and relays 209 and 213 release in succession thereby terminating the current of frequency f2 and starting current of frequency f1 through coils 239, 300 and 400. Each succeeding impulse in the train effects a like operation of relays 200, 209, 213, 203 and 213 and the transmission of impulse signals consisting of current of frequency f2 followed by current of frequency f1. When relay 200 remains operated at the end of the last impulse of the train, relay 201 again releases, and relays 203 and 207 release to terminate the current of frequency f2 which is transmitted at the end of the last impulse. The release of relay 201 causes the release of relay 240 to reconnect talking conductors 161 and 162 to the line T12. The outer contacts of relays 201, 207, 213 and 218 are provided to prevent a short false impulse of frequency f1 in case relay 209 opens its back contact before relay 203 closes its back contact in response to the release of relay 200 and to prevent a short false impulse of frequency f2 in case relay 203 opens its back contact before relay 209 closes its back contact; that is to place control of digit impulses after the first impulse of frequency f2 in relays 207 and 213 alone.

In the signal receiver SR2, the impulse of current of frequency f2 of each dial impulse effects the operation and release of relay 412 and the impulse of current of frequency f1 effects the operation and release of relay 411. The operation of relay 412 closes circuits, including the upper winding of relay 414 and back contacts of relays 411 and 415, for operating relays 421 and 425; but, since relay 419 is normal, relay 426 does not operate. Relay 425 closes a circuit through the left winding of relay 421. Relay 421 short-circuits resistor 413 and connects the winding of relay 427 and lower winding of relay 550 in parallel with the winding of relay 415. When relay 412 releases and relay 411 operates, a circuit is closed through the lower winding of relay 414, back contact of relay 412 and front contact of relay 411, for operating relay 415. The release of relay 412 causes the release of relay 425 but relay 421 is held operated for about .020 second after relay 425 releases by current charging condenser 423. Since relay 411 operates before relay 421 releases, relays 427 and 550 are operated in parallel with relay 415. Relay 415 closes a circuit for operating relay 419 and connects the lower winding of relay 414 to the front contact of relay 411 independent of the back contact of relay 412. Relay 419 short-circuits resistor 413 and connects the winding of relay 426 to the back contact of relay 415. Relay 427 short-circuits the right front contact of relay 421 so as to be held operated after relay 421 releases as long as relay 411 remains operated. Relay 427 opens the normally closed circuit through the winding of relay 431, closes a circuit for operatively energizing the left winding of relay 436, and short-circuits the winding of relay 433. Relay 433 is slow in releasing and remains operated while relay 427 is responding to dial impulses. Relay 431 is held operated for about .020 second, after relay 427 operates, by current charging condenser 429. When relay 431 releases, it disconnects ground from conductor 670. When relay 411 releases at the end of the current of frequency f1, which is the end of the dial impulse signal, relays 415 and 427 release and the lower winding of relay 550 is deenergized. The release of relay 427 opens the short circuit across the winding of relay 433, deenergizes the left winding of relay 436 and closes the circuit for operating relay 431. The operation of relay 431 about .020 second after its operating circuit is closed, reconnects ground to conductor 670. Relay 412 is reoperated by the current of frequency f2 and relay 411 is reoperated by the current of frequency f1 of each succeeding dial impulse signal incoming over line T12 from the transmitter ST1, thereby effecting the alternate disconnection of ground from conductor 670 and reconnection of ground to this conductor in response to each dial impulse. The current of frequency f2 following the last impulse of a train, effects the reoperation of relays 412, 421, 425 and 426 and holds relays 414 and 550 operated. When the current of frequency f2 ends, relays 412, 414, 421, 425, 426 and 550 release and no further operation of the signal receiver occurs until the next signal is received.

The disconnection of ground from and reconnection of ground to conductor 670 by the response of relay 431 to each dial impulse signal of the first train incoming over line T12, causes the release and reoperation of relay 675 of two-way trunk circuit TWT2 and the release and reoperation of relay 688 of selector TS2. Being slow in releasing, relay 677 remains operated during the response of relay 675 to dial impulses. The response of relay 688 to dial impulses effects the operation of selector TS2 to select a corresponding level; and the brushes of selector TS2 are thereupon automatically advanced in the selected level to hunt for an idle set of terminals. When an idle set of terminals are engaged by the brushes, relay 690 is operated to disconnect relay 688 from conductor 670 and connect this conductor through brushes 691, 692 to the line conductors of the trunk or selector connected to the seized set of terminals. Reference may be had to the aforementioned King et al. patent for a complete disclosure of selector TS2 and its operation.

Assuming the call to be one which is routed through an operator's position in the tandem office, the selector TS2 selects an idle set of terminals such as the set 696 thereby connecting conductor 670 through brushes 691 and 692, conductors 1001 and 1002, and windings of retard coil 1000 of incoming trunk circuit IT2 to the winding of line relay 1005. The operation of relay 1005, in series with relay 675 of the two-way trunk circuit TWT2, lights an answering lamp (not shown) to signal the operator. When the call is answered by insertion of a plug P3 in jack J10, the lamp is extinguished and relay 1034 operated in the manner described in the aforementioned King et al. patent. The operation of relay 1034 connects ground to conductor 1004, thence through brush 694 a front contact of relay 690, normally closed contact of the eleventh rotary step springs 689, and through conductor 684, to the winding of relay 671 of two-way trunk circuit TWT2. Relay 671 operates, connecting battery through the back contact of relay 670, back contact of relay 640 of outgoing trunk circuit OT2 and through conductor 664 to operate relay 500 of the signal transmitting circuit ST2. At its back contact, relay 500 opens a normally closed short circuit across the winding of relay 518; and relay 518 operates within .050 second, connecting the upper winding of relay 540, left winding of relay 521 and winding of relay 509, all in parallel, to the back contact of relay 500. At its front contact, relay 500 closes a circuit for operatively energizing the right winding of relay 521, closes a circuit for operating relay 503, closes a circuit for operatively energizing the lower winding of relay 540, and short-circuits the winding of the normally operated relay 501. Relay 521 connects ground to conductor 547 to maintain the operation of the busy indicator 549; but, since the relay 436 of the signal receiving circuit SR2 is operated, the operation of relay 521 is ineffective to cause the operation of relay 520 in series with relay 435 of the receiver circuit. Relay 540 disconnects line T12 and coil 400 from the talking conductors 661 and 662, connects the repeater termination comprising condenser 551 and resistor 552 across the talking conductors, and connects the left winding of coil 539 to and through conductors 541 and 542 to coil 400. Relay 501 is slow in releasing and remains operated for about .1 second after relay 500 operates. Relay 503 closes a circuit for operating relay 507 and disconnects ground from conductor 535 to start current of frequency $f3$ through coils 539 and 400, the conductors of line T12, and coil 300 of line circuit TLC1 in the calling toll office. Relay 507 is slow in operating, the actuation of its contacts, about .020 second after its operating circuit is closed, being effective to connect conductor 535 to ground at the back contact of relay 509 and to disconnect ground from conductor 536. When relay 518 operates, conductor 535 is also connected through both back contacts of relay 513, front contacts of relays 518 and 501, to ground at a front contact of relay 507. The connection of ground to conductor 535 ends the current of frequency $f3$ and the disconnection of ground from conductor 536 starts current of frequency $f4$ through coils 539 and 400, the conductors of line T12 and coil 300. When relay 501 releases, .1 second after relay 500 operates, relay 503 releases and the lower winding of relay 540 is deenergized. Relay 503 opens the operating circuit of relay 507 but relay 507 is held for from .020 to .030 second by current charging condenser 505. The release of relay 540, about .020 second after the release of relay 501, disconnects coil 539 from coil 400 and reconnects line T12 through coil 400 to the talking conductors 661 and 662. The release of relay 507 reconnects conductor 536 to ground at the back contact of relay 509. The release of relay 507, or the release of relay 540, whichever occurs first, ends the current of frequency $f4$ in coils 539 and 400, the conductors of line T12 and coil 300. Thus an answering supervisory or "Off-hook" signal is transmitted over line T12 by an impulse of current of frequency $f3$ for about .020 second followed by current of frequency $f4$ for about .1 second.

In signal receiver SR1, the signaling currents are passed through coils 300 and 303, amplifier 304, filter 305, to the volume limiting amplifier 306. The signaling energy of frequency $f3$ is passed through filter 307 and amplifier detector 309 to energize the winding of relay 311; and the energy of frequency $f4$ is passed through filter 308 and amplifier detector 310 to energize the right winding of relay 312. The output of amplifier 306 is limited to a value sufficient for operating relay 311 only when substantially all of the current is of frequency $f3$ and sufficient for operating relay 312 only when substantially all of the current is of frequency $f4$, thereby preventing the false operation of either of these relays in response to noise, voice or other interfering currents having components of one or both of the signaling frequencies $f3$ and $f4$. The operation of relay 311, in response to the current impulse of frequency $f3$ of the answering supervisory signal, closes a circuit including the lower winding of relay 314, back contact of relay 312 and front contact of relay 311 for operating relays 314 and 315. Since relay 335 is operated, the operation of relay 311 does not cause the operation of relay 332. The closing of the outer right front contact of relay 315 renders the continued operation of this relay independent of relay 312; and the opening of the back contact of relay 315 prevents the operation of relays 321 and 325 while relay 315 remains operated. Relay 315 closes a circuit for operating relay 319. Relay 319 short-circuits resistor 313 to increase the current through the biasing winding of relay 312. Relays 311, 315 and 319 release in succession when the signaling current of frequency $f3$ ends, but relay 319 is held operated by current charging condenser 317 for about .020 second after relay 315 releases. The operation of relay 312, in response to signaling current of frequency $f4$ closes circuits including the upper winding of relay 314, back contact of relay 311, front contact of relay 312, back contact of relay 315, and the windings of relays 325 and 321 for operatively energizing each of these windings; and, since relay 319 has not released, relay 312 also closes circuits including the upper winding of relay 314, back contact of relay 311, front contact of relay 312, back contact of relay 315 and left front contact of relay 319 for operatively energizing the winding of relay 326 and the upper winding of cut-off relay 250. At its right contact, relay 321 short-circuits resistor 313; and, at its left contact, relay 321 connects the winding of relay 327 and the lower winding of relay 250 in parallel with the winding of relay 315. Relay 325 closes a circuit for operatively energizing the right winding of relay 321. Relay 326 closes a holding circuit for its winding in parallel with the upper winding of relay 250 so that these relays remain operated, after relay 319 releases, until relay 312 releases. At its left front contact, relay 326 closes a circuit including the right front contact of relay 335 for operating relay 332. Relay 332 locks under control of relay 333 and closes a circuit including the back contact of relay 331 and left front contact of relay 332 for operatively energizing the left winding of relay 336. Relay 336 does not disconnect battery from the winding of relay 335, since relay 235 was operated upon seizure of outgoing trunk circuit OT1 as hereinbefore described. Relay 250 disconnects the talking conductors 161 and 162 from coil 300 and bridges condenser 251 and resistor 252 across these conductors. When the signaling current of frequency $f4$ ceases, relay 312 releases, causing the release of relays 321, 325, 326 and 250. Relays 321 and 250 are slow in releasing, the energization of the right winding of relay 321 being maintained for about .020 second after relay 325 releases by current charging condenser 323. The release of relay 321 disconnects the winding of relay 327 from the front contact of relay 311; and the release of relay 250 reconnects line T12 and coil 300 to talking conductors 161 and 162.

The aforementioned operation of relay 332, in response to signaling current of frequency $f4$ following signaling current of frequency $f3$, closes a circuit from ground at the front contact of normally operated relay 331, through conductor 170, a front contact of relay 110 of outgoing trunk circuit OT1, and winding of relay 105, to battery. Relay 105 operates, disconnecting ground from the lower winding of relay 104 to increase the resistance of the circuit through conductor 103 and thereby effect the extinguishing of the supervisory lamp (not shown) associated with plug P2 of cord CD1, in the manner set forth in detail in the aforementioned King et al. patent.

When dialing is completed, relay 130 is operated in the manner described in the aforementioned King et al. patent. The talking connection between outgoing trunk circuit OT1 and incoming trunk circuit IT2 includes conductors 101 and 102, front contacts of relay 130, conductors 161 and 162, back contacts of relays 250 and 240 of toll line circuit TLC1, conductors 241 and 242, left windings of coil 303 and resistors 301 and 302, repeating coil 300, line T12, repeating coil 400 of toll line circuit TLC2, right windings of coil 403 and resistors 401 and 402, conductors 541 and 542, back contacts of relays 540 and 550, conductors 661 and 662, back contacts of relay 630 of trunk circuit OT2, front contacts of relay 673 of trunk circuit TWT2, conductors 681 and 682, front contacts of relay 690 of selector TS2, brushes 691 and 692, conductors 1001 and 1002, condensers 1050, and conductors 1041 and 1042 of incoming trunk circuit IT2.

If the answering operator disconnects cord CD2 from jack J10, relay 1034 is released in the manner described in the aforementioned application of J. G. Walsh to effect the sending of an on-hook signal to the calling operator. The release of relay 1034 disconnects ground from conductor 1004 and effects the release of relays 671 and 500. The release of relay 500 opens the short circuit across the winding of relay 501, closes a short circuit across the winding of relay 518, closes circuits for operating relay 509, for holding relay 521 operated and for operatively energizing the upper winding of relay 540. Relay 540 connects coil 539 to coil 400 and connects condenser 551 and resistor 552 in series across conductors 661 and 662. The operation of relay 509 closes the circuit through the winding of relay 513 and disconnects ground from conductor 536 thereby starting current of frequency f4 through coils 539 and 400, line T12, and coil 300. About .020 second after relay 509 operates, relay 513 operates, disconnecting ground from conductor 535 to start current of frequency f3 through coils 539, 400 and 300 and connecting ground to conductor 536 to terminate the current of frequency f4. Relay 501 operates within .050 second after relay 500 releases thereby connecting ground at the inner right front contact of relay 515, through front contacts of relays 513, 518 and 501, and through back contacts of relay 507, to conductor 536. When relay 518 releases, about 1.3 second after relay 500 releases, it causes the release of relays 509, 521 and 540. The release of relay 509 opens the circuit of relay 513 and connects ground to conductor 536. Relay 513 is held operated for about .020 second while condenser 511 is being charged, the release of relay 513 being effective to reconnect ground to conductor 535 thus terminating current of frequency f3 through coil 539. The release of relay 540, about .020 second after relay 518 releases, disconnects coil 539 from coil 400 and reconnects line T12 through coil 400 to conductors 661 and 662. Thus a signal consisting of current of frequency f4 followed by current of frequency f3 is transmitted over line T12 to the receiver SR1 in response to the disconnection of cord CD2 from jack J10. In receiver SR1, relay 312 operates in response to the current of frequency f4 thereby effecting the operation of relays 314, 321 and 325. The release of relay 312 at the end of the current of frequency f4 causes the release of relays 321 and 325. The operation of relay 311, in response to the current of frequency f3, effects the operation of relays 314, 315, and also the operation of relays 327 and 250, since relay 321 is held operated for about .020 second after relay 325 releases by current charging condenser 323. Relay 327 connects its winding in parallel with relay 315 so as to remain operated after relay 321 releases until relay 311 releases. The operation of relay 315 causes the operation of relay 319; and the operation of relay 327 short-circuits the winding of relay 333 and causes the release of relay 331, the release of relay 331 being delayed by current charging condenser 329. Relay 331 disconnects ground from conductor 170 to release relay 105 of trunk circuit OT1. Since the current of frequency f3 continues for about 1.3 seconds, the operation of relay 327 causes the release of relay 333; and the release of relay 333 causes the release of relay 332. When relay 311 releases, at the end of the current of frequency f3, relays 314, 315 and 327 release. The release of relay 315 causes the release of relay 319; and the release of relay 327 causes the release of relay 250 and reoperation of relay 331. Since relay 332 has released, the reoperation of relay 331 is ineffective to reoperate relay 105; and, therefore, the supervisory lamp associated with plug P2 is permanently lighted.

If the calling operator wishes to recall the answering operator, operation of the ringing key, which is not shown but is associated with cord CD1, causes a momentary release of relay 140 in the manner described in the aforementioned King et al. patent. The release and reoperation of relay 140 causes a release and reoperation of relay 200, whereby the signal transmitter ST1 operates to send a signal consisting of current of frequency f2 followed by current of frequency f1 followed by current of frequency f2 over toll line T12, the same as for a single dial impulse. The signal receiver SR1 responds to the rering signal in the manner hereinbefore described for responding to a dial impulse thereby effecting a momentary opening and reclosure of the circuit through conductor 670, causing the release and reoperation of relay 675 of two-way trunk circuit TWT2 and relay 1005 of incoming trunk circuit IT2. The release and reoperation of relay 1005 causes the flashing of the supervisory lamp (not shown) associated with cord CD2 until the answering operator answers the recall signal, all as described in the aforementioned application of J. G. Walsh and patent to King et al.

If the answering operator wishes to signal the calling operator, operation of the ringing key (not shown) of cord CD2 causes the opening of the circuit through conductor 1004 in the manner described in the aforementioned application of J. G. Walsh, to cause the release and reoperation of relay 671 of two-way trunk circuit TWT2 and a corresponding release and reoperation of relay 500 of signal transmitter ST2. The signal transmitter ST2 is thereupon operated to transmit a ringing signal consisting of current of frequency f4 followed by current of frequency f3 followed by current of frequency f4, in a similar manner to that in which the signal transmitter ST1 effects the transmission of a single dial impulse signal as hereinbefore described. The signal receiver SR1 responds to the ringing signal in similar manner to that in which the signal receiver SR2 responds to a dial impulse signal, as hereinbefore described, thereby opening and closing the circuit through conductor 170 to effect a momentary release of relay 105. The release of relay 105 connects ground to the lower winding of relay 104 to decrease the resistance in the circuit through conductor 103 and thereby effect the lighting of the supervisory lamp associated with plug P2 of cord CD1 as described in the aforementioned King et al. patent.

If the selector TS2 encounters an all-trunks-busy condition in the selected group, closure of the eleventh rotary step springs 689 connects conductor 684 to interrupter 629 thereby causing the alternate operation of relay 671 for .5 second and release of relay 671 for .5 second until the connection is released by the calling operator. Each operation and release of relay 671 causes a corresponding operation and release of relay 500. The first operation of relay 500 effects the transmission over line T12 of a signal consisting of current of frequency $f3$ followed by current of frequency $f4$, similar to the answering supervisory signal, hereinbefore described; and each succeeding release of relay 500 effects the transmission over line T12 of a signal consisting of current of frequency $f4$ followed by current of frequency $f3$, the operations of the various relays of transmitter ST2 being similar to those of the corresponding relays of transmitter ST1 to effect the transmission of off-hook and on-hook signals as hereinbefore described. In receiver SR1, each signal comprising current of frequency $f3$ followed by current of frequency $f4$ effects operations similar to those effected in response to an off-hook signal and each signal comprising current of frequency $f4$, followed by current of frequency $f3$, effects operations similar to those effected in response to an on-hook signal as above described. Relay 105 is thereby alternately operated and released to flash the supervisory lamp associated with plug P2.

When the calling operator disconnects plug P2 from jack J2 to release the connection, relay 104 releases and causes the release of relays 110, 130 and 140 as described in the aforementioned application of J. G. Walsh. The release of relay 140 causes the release of relay 200. At its front contact relay 200 opens the short circuit across the winding of relay 201 and causes the deenergization of the left winding of relay 221. At its back contact, relay 200 closes circuits for operating relays 209 and 240 and for holding relay 221. Relay 240 operates to connect coil 239 to toll line T12 and relay 209 operates to disconnect ground from conductor 236 and thus start a current of frequency $f2$ through coils 239 and 300, line T12, and coil 400. Relay 209 closes the circuit for operating relay 213; and when relay 213 operates, about .020 second later, it disconnects ground from conductor 235 and connects conductor 236 to ground, thereby ending the current of frequency $f2$ and starting a current of frequency $f1$ through coils 239, 300 and 400. When relay 201 reoperates, within .050 second after relay 200 releases, ground at the inner left front contact of relay 215 is connected through front contacts of relays 213, 218 and 201 and back contacts of relay 207 to conductor 236. About .6 second after relay 200 releases, relay 215 releases due to the short-circuiting of its winding at the back contact of relay 209. The release of relay 215 causes the immediate release of relay 213 and closes a short circuit across the winding of relay 216. The release of relay 215 disconnects ground from conductor 236 and the release of relay 213 connects ground to conductor 235 thereby ending the current of frequency $f1$ and starting current of frequency $f2$ through coils 239, 300 and 400. About .1 second after relay 215 releases, relay 216 releases thereby connecting ground at the back contact of relay 200 through the front contact of relay 229, and outer back contact of relay 216 to short-circuit the winding of relay 218. The release of relay 216 causes the reoperation of relay 215 thereby effecting the reoperation of relay 213. The reoperation of relay 215 does not cause the reoperation of relay 216 since the winding of relay 216 is short-circuited through its inner back contact and the front contact of relay 229 to ground at the back contact of relay 200. The reoperation of relay 213 connects ground to conductor 236 and disconnects ground from conductor 235 thereby ending the current of frequency $f2$ and starting current of frequency $f1$ through coils 239, 300 and 400. About 1.3 seconds after the release of relay 216 closes a short circuit across the winding of relay 218, relay 218 releases, thereby causing the release of relays 209 and 221 and the deenergization of the upper winding of relay 240. The release of relay 209 opens the circuit through the winding of relay 213; and the release of relay 213, about .020 second later, connects ground to conductor 235 to end the current of frequency $f1$. The release of relay 221 disconnects ground from conductor 247 leading to the busy indicator 249 and causes the release of relays 220 and 335. The release of relay 240, about .020 second after relay 218 releases, disconnects coil 239 from coil 300 and reconnects coil 309 to talking conductors 161 and 162. Thus the release of relay 200 effects the transmission of a disconnect signal over line T12 consisting of current of frequency $f2$ for about .020 second, followed by current of frequency $f1$ for about .6 second, followed by current of frequency $f2$ for about .1 second, followed by current of frequency $f1$ for about 1.3 second.

The signal receiver SR2 responds to the disconnect signal in the following manner. The first current impulse of frequency $f2$ causes the operation of relays 412, 414, 421 and 425. Since neither of relays 419 or 431 are operated when the first impulse of the disconnect signal is received, relay 412 is more sensitive than when dial impulses are being received so that this relay is more certain to respond in case interfering currents are present. When the first impulse of frequency $f2$ ends, relay 412 releases and relay 425 releases but relay 421 remains operated for about .020 second. The first current impulse of frequency $f1$ causes the operation of relays 411, 414, 415, 427 and 559. The operation of relay 415 causes the operation of relay 419 and the operation of relay 427 causes the release of relay 431. Relay 431 disconnects ground from conductor 670 to release relay 675 of two-way trunk circuit TWT2 and relay 1065 of incoming trunk circuit IT2. Since relay 412 holds relays 427 operated and relay 431 released for about .6 second, relay 677 of the two-way trunk circuit TWT2 also releases disconnecting ground from conductor 683 to cause the release of relay 690 of selector TS2 and the return of this selector to normal as described in the aforementioned King et al. patent. Relay 433 releases about .5 second after its winding is short-circuited by the operation of relay 427, thus causing the release of relay 432. If the answering operator has disconnected cord CD2 from jack J10 and relay 521 is normal, ground at the back contact of relay 521 is connected through conductor 546 and the back contact of relay 433 to operate relay 439. Relay 439 closes a circuit for holding relay 436, maintains the short circuit across the winding of relay 433, and closes a short circuit around the winding of slow-to-release relay 437. About .4 second later, relay 437 releases, causing the release of relay 439 and preventing its own reoperation as long as relays 433 and 521 remain released. When the first impulse of current of frequency $f1$ ends, relays 411, 415, 419 and 427 release. The release of relay 427 is ineffective to reoperate relay 433 while relay 439 is operated. The operation of relay 412 responsive to the second impulse of current of frequency $f2$ holds relays 414 and 550 and operates relays 421, 425 and 426. Since relay 435 is not operated, the operation of relay 426 is ineffective to cause the reoperation of relay 432. When the second impulse of current of frequency $f2$ ends, relays 412, 421, 425 and 426 release. The operation of relay 411, in response to the second impulse of current of frequency $f1$ and before relay 421 releases, holds relays 414 and 550 and operates relays 415 and 427 but is ineffective to cause the reoperation of relay 432 because relay 433 is released. Relay 415 closes the circuit for operating relay 419. The operation of relay 427 causes the release of relay 431 and again connects ground to hold relay 436 operated and relay 433 released. Since the aforementioned release of relay 439 does not occur until after relay 431 has reoperated, there is no opening of the short circuit around the winding of relay 433 until the second impulse of frequency $f1$ has ended. When the second impulse of frequency $f1$ ends, the release of relay 411 causes the release of relays 414, 415, 419, 427 and 550. The release of relay 427 causes the reoperation of relay 431, the release of relay 436 and the reoperation of relay 433; and the operation of relay 433 causes the reoperation of relay 437. If the first impulses of current of frequencies $f2$ and $f1$ of the disconnect signal should fail to effect release of relay 433, the second impulses will cause the release of relays 432 and 433, the operation of relay 439 and release of relay 437. Since the final impulse of current of frequency $f1$ endures for about 1.3 second relay 437 releases and relay 439 also releases before relay 427 releases. When the final impulse ends, the release of relay 411 causes the release of relays 414, 415, 419, 427 and 550; the release of relay 427 causes the reoperation of relay 431, the release of relay 436 and the reoperation of relay 433; and the operation of relay 433 causes the reoperation of relay 437.

From the foregoing description, it is to be noted that the busy relay 221 of the signal transmitter ST1 at the calling end of toll line T12 is operated by the energization of one winding whenever relay 200 is released until relay 218 reoperates after sending the disconnect signal; and busy relay 336 of the signal receiver SR1 at the calling end of toll line T12 is operated whenever a signal is being received. At the called end of toll line T12, the busy relay 436 of signal receiver SR2 operates as soon as relay 432 operates in response to the seizure signal and remains operated until the release of relay 427 when the last impulse of current of frequency $f1$ of the disconnect signal ends; and the busy relay 521 of signal transmitter ST2 is operated whenever a signal is being transmitted to the calling operator.

The signal receiver SR2 may be arranged to respond to a prolonged impulse of current of frequency $f1$ without being preceded by an impulse of current of frequency $f2$ by disconnecting conductor 434 from the right front contact of relay 427 and connecting this conductor to another front contact of relay 415; which contact connects ground to conductor 434 whenever relay 415 is operated. When so modified, the continued operation of relay 415 in response to current of frequency $f1$ will short circuit the winding of relay 433 to effect the release of relays 433 and 432 and thereby open the circuit through conductor 670 to cause release as above described. When so arranged the receiver SR1 will respond to either a single frequency or a sequence disconnect signal.

Assume next that the call initiated by the calling operator in the first toll office is one which is routed through the tandem office to a third toll office, the first digit dialed effecting the operation of selector TS2 to select a level giving access to the called toll office. The terminals 695 represent such a level in the bank of selector TS2; and, upon selection of these terminals and operation of relay 699, the holding ground connected to conductor 683 is further connected through a front contact of relay 699, brush 693, conductor 923, and through the inner lower back contact of relay 973 of two-way trunk circuit TWT3, to the winding of relay 974. Relay 974 operates and locks to conductor 923 independent of relay 973. The aforementioned operation of relay 699 also closes a circuit for holding relay 675 of two-way trunk circuit TWT2 and for operating relay 970 of two-way trunk circuit TWT3. This circuit is traced from ground at the front contact of relay 431 of signal receiver SR2, front contact of relay 432, conductor 670, back contact of relay 610 of outgoing trunk circuit OT2, back contact of relay 674 of two-way trunk circuit TWT2, winding of relay 675, front contact of relay 673, windings of retard coil 660, outer back contacts of relay 630, outer front contacts of relay 673, conductors 681 and 682, front contacts of relay 699, brushes 691 and 692, conductors 921 and 922, outer back contacts of relay 973, outer back contacts of relay 930, windings of retard coil 960, inner upper back contact of relay 973, through the upper operating winding of relay 970 to battery. Relay 970 closes a circuit for operating relay 860 of signal transmitter ST3 associated with toll line T34 leading to the called toll office. The signal transmitter ST3 is thereupon operated to send over toll line T34 a seizure signal consisting of current of frequency $f1$ for about .020 second followed by current of frequency $f2$ for about .1 second. When the calling operator dials the remaining digits of the called toll route and called subscriber's line, the signal transmitter ST3 will be operated under the control of relay 431 of signal receiver SR2 and relay 970 of two-way trunk circuit TWT3 to send dial impulse signals over line T34 in similar manner to that in which the signal transmitter ST1 operates to transmit these impulses over trunk T12 as hereinbefore described. The receiving cut-off relay 559 of toll line circuit TLC2 and the sending cut-off relay 840 of toll line TLC3 are operated to prevent the transmission of the dial impulse signals consisting of currents of frequencies $f2$ and $f1$ through the talking connection between toll lines T12 and T34.

When an answering supervisory signal consisting of current of frequency $f3$ followed by current of frequency $f2$ is received over toll line T34, the signal receiver SR3 responds in like manner to that in which the signal receiver SR1 responds to such a signal as hereinbefore described. The receiving cut-off relay 850 is operated to prevent the transmission of the answering signal through the talking connection between toll lines T34 and T12. The operation of relay 732 of signal receiver SR3 in response to the answering supervisory signal connects ground to conductor 970, thence through a back contact of relay 910 of outgoing trunk circuit OT3, the lower front contact of relay 974, conductor 924, brush 694 of selector TS2, front contact of relay 690, back contact of springs 689, conductor 634, to the winding of relay 671 of two-way trunk circuit TWT2. Relay 671 closes a circuit through conductor 664 for operating relay 500 of the signal transmitter ST2 and an answering signal is thereupon transmitted through toll line T12 to the signal receiver SR1 in the manner hereinbefore described.

When the answering operator in the third toll office or called subscriber releases the connection, the signal receiver SR3 receives an "on-hook" signal consisting of current of frequency f4 followed by current of frequency f3, whereby relay 731 is momentarily operated to disconnect ground from conductor 970 and thus cause the release and reoperation of relays 671 and 500 in succession. The release and reoperation of relay 500 causes the signal transmitter ST2 to send over toll line T12 a signal consisting of current of frequency f4 followed by current of frequency f3. The operation of receiving cut-off relay 850 of toll line circuit TLC3 prevents the "on-hook" signal from being transmitted through the talking connection between lines T34 and T12.

Ringing signals received over toll line T34 by receiver SR3 are repeated over toll line T12 to the signal receiver SR1 in similar manner to that in which "on-hook" signals are repeated as above described; and recall signals sent over toll line T12 by the signal transmitter ST1 are received by signal receiver SR2 and repeated by relays 431, 970 and 800 to effect the operation of the signal transmitter ST3 to send a like signal over toll line T34.

When the calling operator disconnects, a disconnect signal is sent by the transmitter ST1 over toll line T12 to the receiver SR2. The receiving cut-off relay 550 operates to prevent the transmission of this signal through the talking connection between lines T12 and T34. The disconnect signal effects the release of relays 675 and 677 of two-way trunk circuit TWT2 and return of selector TS2 to normal, as hereinbefore described, and causes the release of relays 970 and 974 of two-way trunk circuit TWT3 and the release of relay 800 of signal transmitter ST3. The release of relay 800 causes the signal transmitter ST3 to operate to send a disconnect signal over toll line T34 to the signal receiver associated with toll line T34 in the third toll office.

It should here be noted that on calls routed through the tandem office, all of the first frequency and a part of the second frequency of a signal in either direction is passed through the talking connection between lines T12 and T34 before the cut-off relays operate to open the talking connection. Referring to the signal receiver SR1, a false signal operation in response to the part of a signal passed through the tandem office from toll line T34 to toll line T12 before the talking connection is opened, is prevented by making the signal relay 331 slow in releasing. Relay 314 operates, whenever either one of relays 311 or 312 operates, to disconnect the ground at its back contact from the direct current signal receiving circuit through conductor 170 leaving this circuit under the control of relay 331. But, since relay 331 does not release until about .020 second after relay 327 operates, relay 314 will have released due to the current of frequency f1 being ended by the opening of the talking connection in the tandem office, and the connection of ground through the back contact of relay 314 to conductor 170 prevents a false signal operation. To prevent impulse distortion during the receipt of dial impulses on an incoming call, relay 331 is also slow in operating so that the closing of the direct current signaling circuit through conductor 170 is delayed for the same interval that the opening of this circuit is delayed. In case there is sufficient distortion of the impulses in the voice frequency signaling circuits to require impulse correction, an impulse connecting repeater may be substituted for relay 331, the delay inherent in such a repeater being effective to prevent false operation in response to partial signals passed through the talking connection in a tandem office before this connection is opened.

Calls incoming over toll line T34 to the tandem office are completed to an answering operator in the tandem office or to a toll line T12 to the first toll office in similar manner to that in which like calls originating in the first toll office are completed, as hereinbefore described. The lines T12 and T34 may also be seized by an operator in the tandem office on outgoing calls in which case the associated outgoing trunk, two-way trunk, signal transmitter and signal receiver circuits function in similar manner to that of the corresponding circuits on calls from an operator in the first toll office as hereinbefore described.

When a common volume limiting amplifier is used for both signaling frequencies, as in signal receiver SR1 and SR2 above described, the limiter aids in preventing a signal operation in response to voice and noise currents and is also effective at the time the signaling current is changed from one signaling frequency to the other to aid the release of the relay operated by the first frequency. If, however, echoes of the first frequency are received at a relatively high level with respect to the signaling current of the second frequency, the relay responsive to the first frequency may be held operated and the operation of the relay responsive to the second frequency may be delayed long enough to prevent a signal response. A high level of noise may also cause failure to respond to either or both of the currents which constitute a signal. One method of avoiding these difficulties is to provide separate volume limiting amplifiers for each frequency as shown in Fig. 10. In this figure the toll line T12 is shown with signal receiver SR1' and SR2' connected thereto, these receivers being similar to the signal receivers SR1 and SR2 of Figs. 3 and 4 except that separate volume limiting amplifiers 309', 310', 409' and 410' are provided. The band-pass filters 307 and 308 and 407 and 408 are the same as those of like designation in receivers SR1 and SR2; and the signal relays 311, 312, 411 and 412 and the other relays (not shown) are identical with corresponding relays in receivers SR1 and SR2. Each of the amplifiers 309', 310', 409' and 410' may be of the type disclosed in the patent to N. Bishop No. 1,863,895 of June 21, 1932, and in the patent to G. T. Lorance No. 1,654,085 of December 27, 1927, or of the type disclosed in the patent to E. Peterson No. 1,830,240 of November 3, 1931.

Referring to the receiver SR1', the band-pass filter 307 passes only current of frequency *f3* and the band-pass filter 308 passes only current of frequency *f4*. Each of the amplifiers 309' and 310' limits the current input to the associated signal relay to a constant value irrespective of variation in the level of the signaling current incoming over the line, thereby reducing signal distortion. The limiters are of the slow recovery type so that the gain of the amplifier increases slowly, thereby preventing the holding of the signaling relay 311 or 312, after the signaling current ends. The band-pass filters 307 and 308 are located between the line and the individual limiters in order that line noises, oppositely directed signals and local plant tones will not affect the volume control or relay action.

While not shown in the drawings, selectors may be provided in the first toll office; and additional selectors may be provided in the tandem office to route incoming calls to incoming trunks, switching trunks to local offices, and toll lines to other offices, as required.

What is claimed is:

1. In combination, a line, a signal transmitter connected to one end of said line, a signal receiver connected to the other end of said line, said transmitter adapted to transmit signals, each of said signals consisting of current of one of two signaling frequencies followed by current of the other of said frequencies, said receiver comprising a first relay, means responsive only to current of one of said frequencies for operating said relay, a second relay, means responsive only to current of the other of said frequencies for operating said second relay, a signal circuit, means responsive to an operation of said first relay for closing said signaling circuit, and means thereafter responsive to the operation of said first relay only within a predetermined interval of time subsequent to the operation of said second relay for controlling said signaling circuit.

2. In combination, a line, a signal transmitter connected to one end of said line, a signal receiver connected to the other end of said line, said transmitter adapted to transmit signals consisting of current of one of two signaling frequencies followed by current of the other of said frequencies, said receiver comprising a first relay, means responsive only to current of one of said frequencies for operating said relay, a second relay, means responsive only to current of the other of said frequencies for operating said second relay, a signal circuit, means for marking said line busy, and means responsive to an operation of said first relay for closing said signaling circuit and for operating said busy marking means, and means thereafter responsive to the operation of said first relay only within a predetermined interval of time subsequent to the operation of said second relay for controlling said signaling circuit.

3. A signal receiver connected to a line for responding to signals consisting of current of either one of two signaling frequencies followed by current of the other of said frequencies, said receiver comprising a first relay, means responsive only to current of one of said frequencies for operating said first relay, a second relay, means responsive only to current of the other of said frequencies for operating said second relay, a signaling circuit, means responsive to an operation of said first relay for closing said signaling circuit, and means responsive to a succeeding operation of said first relay within a predetermined interval of time after the operation of said second relay for opening said signaling circuit.

4. In a signaling system, a line, a signal relay, means including relays responsive to each operation of said signal relay for transmitting a signal consisting of current of one frequency for a predetermined interval of time followed by current of another frequency over said line, means including relays responsive to each release of said signal relay for transmitting a signal consisting of current of said other frequency for a predetermined interval of time followed by current of said one frequency, and means including relays responsive to the continued release of said signal relay for more than a predetermined interval of time for ending the current of said one frequency and for repeating the signal.

5. In a signaling system, a line, a signal relay, means including relays responsive to each operation of said signal relay for transmitting a signal consisting of current of one frequency for a predetermined interval of time followed by current of another frequency over said line, means for ending the current of said other frequency at the end of a predetermined interval of time, means including relays responsive to each release of said signal relay for transmitting a signal consisting of current of said other frequency for a predetermined interval of time followed by current of said one frequency, and means including relays responsive to the continued release of said signal relay for more than a predetermined interval of time for ending the current of said one frequency and for repeating the signal.

6. In a signaling system, a line, a signal relay, means including relays responsive to each operation of said signal relay for transmitting a signal consisting of current of one frequency for a predetermined interval of time followed by current of another frequency over said line, means for ending the current of said other frequency at the end of a predetermined interval of time, means including relays responsive to each release of said signal relay for transmitting a signal consisting of current of said other frequency for a predetermined interval of time followed by current of said one frequency, and means including relays responsive to the continued release of said signal relay for more than a predetermined interval of time for ending the current of said one frequency for thereupon initiating a current of said other frequency, for ending the current of said other frequency after a predetermined interval of time, for thereupon starting a current of said one frequency, and for ending the current of said one frequency at the end of a predetermined interval of time.

7. In a signaling system, a line, a signal relay, means including relays responsive to each operation of said signal relay for transmitting a signal consisting of current of one frequency for a predetermined interval of time followed by current of another frequency over said line, means for ending the current of said other frequency at the end of a predetermined interval of time, means including relays responsive to each release of said signal relay for transmitting a signal consisting of current of said other frequency for a predetermined interval of time followed by current of said one frequency, and means including relays responsive to the continued release of said signal relay for more than a predetermined interval of time for ending the current of said one frequency for thereupon initiating a current of said other frequency, for ending the current of said other frequency after a predetermined interval of time, for thereupon starting a current of said one frequency, and for ending the current of said one frequency at the end of a predetermined interval of time, each of the two last-mentioned predetermined intervals of time being greater than the first two mentioned predetermined intervals of time relating to the signal transmitted in response to the release of said signal relay.

8. A signal receiver connected to a line for responding to signals consisting of current of either one of two signaling frequencies followed by current of the other of said frequencies, said receiver comprising a first relay, means responsive only to current of one of said frequencies for operating said first relay, a second relay, means responsive only to current of the other of said frequencies for operating said second relay, a signaling circuit, means responsive to an operation of said second relay within a predetermined interval of time after the release of said first relay for closing said signaling circuit, means responsive to an operation of said first relay within a predetermined interval of time after the release of said second relay for opening said signaling circuit, and means effective a predetermined interval of time after the opening of said circuit for preventing the closing of said circuit responsive to an operation of said second relay following an operation of said first relay.

9. A signal receiver connected to a line for responding to signals consisting of current of either one of two signaling frequencies followed by current of the other of said frequencies, said receiver comprising a first relay, means responsive only to current of one of said frequencies for operating said first relay, a second relay, means responsive only to current of the other of said frequencies for operating said second relay, a signaling circuit, means repsonsive to an operation of said first relay for closing said signaling circuit, means responsive to each succeeding momentary operation of said first relay within a predetermined interval of time after an operation of said second relay for opening and closing said signaling circuit, and means responsive to the operation of said first relay within a predetermined interval of time after the operation of said second relay and the continued operation of said first relay for more than a predetermined interval of time for preventing for a predetermined interval of time the closing of said circuit responsive to an operation of said second relay following the operation of said first relay.

10. In a signaling system, a line, a signal transmitter connected to one end of said line, a signal receiver connected to the other end of said line, a signal relay controlling the operation of said transmitter, a signaling circuit controlled by said receiver, said transmitter comprising means including relays responsive to each operation of said signal relay for transmitting over said line a seizure signal consisting of current of a first one of two signaling frequencies for a predetermined interval of time followed by current of the second of said frequencies, means for terminating the current of said first frequency after said signal relay has remained operated for a predetermined interval, means including relays responsive to each momentary release of said signal relay for transmitting a signal consisting of current of said second frequency for a predetermined interval of time followed by current of said first frequency until said signal relay reoperates, means including relays responsive to the continued release of said signal relay for transmitting a disconnect signal consisting of current of said second frequency for a predetermined interval of time followed by current of said first frequency for a longer predetermined interval of time, followed by current of said second frequency for a predetermined interval of time longer than the first impulse of current of said second frequency, followed by current of said first frequency for a predetermined interval of time longer than the first impulse of said first frequency, said receiver comprising a first relay, means responsive only to current of said first frequency for operating said first relay, a second relay, means responsive only to current of said second frequency for operating said second relay, means responsive to the operation of said first relay in response to the current of said first frequency of said seizure signal for closing said signaling circuit without waiting for the operation of said second relay in response to the current of said second frequency, means responsive to the operation of said first relay within a predetermined interval following a release of said second relay for opening said signaling circuit until said first relay releases, means responsive to the operation of said first relay within a predetermined interval of time after an operation of said second relay in response to the first impulse of current of said first frequency of said disconnect signal for opening said signaling circuit and for holding said circuit open while said first impulse of current of said first frequency continues, means rendered effective before said first relay releases for preventing the closing of said signaling circuit upon operation of said second relay in response to the second impulse of said second frequency of said disconnect signal, and means effective a predetermined interval of time after the release of said first relay at the end of the second impulse of current of said first frequency of the disconnect signal for rendering a succeeding operation of said first relay effective to close said signaling circuit.

11. In a telephone system, a two-way trunk line, a signal receiver and a signal transmitter individually associated with each end of said line, the signal receiver at one end of said line adapted to respond to signals consisting of current of a first voice frequency followed by current of a second voice frequency and to signals consisting of current of said second frequency followed by current of said first frequency, the signal transmitter at said one end adapted to transmit signals consisting of current of a third voice frequency followed by current of a fourth voice frequency and signals consisting of current of said fourth frequency followed by current of said third frequency, the signal receiver at the other end of said line adapted to respond to signals consisting of current of said third frequency followed by current of said fourth frequency and to signals consisting of current of said fourth frequency followed by current of said third frequency, the signal transmitter at said other end of said line adapted to transmit signals consisting of current of said first frequency followed by current of said second frequency and signals consisting of current of said second frequency followed by current of said first frequency, another trunk line having like signal receivers and transmitters associated therewith, means connecting said lines for conversation, means at each end of each of said lines for opening the talking connection over the associated line while a signal is being transmitted or received thereover, means responsive to a signal received over one of said lines for transmitting a corresponding signal over the other of said lines, and means in each of said receivers for preventing a signal response until the current of the second frequency of a signal has continued for a predetermined interval of time.

12. In a telephone system, a two-way trunk line, a signal receiver and a signal transmitter individually associated with each end of said line, the signal receiver at one end of said line adapted to respond to signals consisting of current of a first voice frequency followed by current of a second voice frequency and to signals consisting of current of said second frequency followed by current of said first frequency, the signal transmitter at said one end adapted to transmit signals consisting of current of a third voice frequency followed by current of a fourth voice frequency and signals consisting of current of said fourth frequency followed by current of said third frequency, the signal receiver at the other end of said line adapted to respond to signals consisting of current of said third frequency followed by current of said fourth frequency and to signals consisting of current of said fourth frequency followed by current of said third frequency, the signal transmitter at said other end of said line adapted to transmit signals consisting of current of said first frequency followed by current of said second frequency and signals consisting of current of said second frequency followed by current of said first frequency, another trunk line having like signal receivers and transmitters associated therewith, means connecting said lines for conversation, means at each end of each of said lines for opening the talking connection over the associated line while a signal is being transmitted or received thereover, means responsive to a signal received over one of said lines for transmitting a corresponding signal over the other of said lines, and means in each of said receivers for delaying the signal response for a predetermined interval after the beginning of current of the second frequency of an incoming signal.

13. A signal receiver adapted to respond to signals, each of said signals consisting of current of either one of two frequencies followed by current of the other of said two frequencies, said receiver comprising a first relay, means responsive only to current of a first one of said frequencies for operating said first relay, a second relay, means responsive only to current of the second of said frequencies for operating said second relay, a signal circuit, means responsive to an operation of said first relay for closing said circuit, a third relay, the operation of said third relay being effective to open said circuit, and means for operating said third relay only in response to the successive operation of said second and first relays in the order named.

14. A signal receiver adapted to respond to signals consisting of current of either one of two frequencies followed by current of the other of the two frequencies, said receiver comprising a first relay, means responsive only to current of a first one of said frequencies for operating said first relay, a second relay, means responsive only to current of the second of said frequencies for operating said second relay, a signal circuit, means including a third relay responsive to the operation of said second relay followed by the operation of said first relay for opening said circuit, and means for delaying the opening of said circuit for a predetermined interval of time after the operation of said third relay.

15. A signal receiver adapted to respond to signals consisting of current of either one of two frequencies followed by current of the other of the two frequencies, said receiver comprising a first relay, means responsive only to current of a first one of said frequencies for operating said first relay, a second relay, means responsive only to current of the second of said frequencies for operating said second relay, a signal circuit, means including a third relay responsive to the operation of said second relay followed by the operation of said first relay for opening said circuit, and means comprising a slow-to-release relay for delaying the opening of said circuit for a predetermined interval of time after the operation of said third relay.

16. In a signaling system, a signal receiver adapted to respond to signals consisting of current of a first voice frequency followed by current of a second voice frequency and to signals consisting of current of said second frequency followed by current of said first frequency, a first relay, means responsive only to current of said first frequency for operating said first relay, a second relay, means responsive only to current of said second frequency for operating said second relay, a signal circuit, means responsive to the operation of said second relay following the operation of said first relay for closing said circuit, means responsive to the operation of said first relay following the operation of said second relay for opening said circuit, and means effective in response to the operation of either of said first and second relays for decreasing the sensitivity of said second relay.

17. In a signaling system, a signal receiver adapted to respond to signals consisting of current of a first voice frequency followed by current of a second voice frequency and to signals consisting of current of said second frequency followed by current of said first frequency, a first relay, means responsive only to current of said first frequency for operating said first relay, a second relay, means responsive only to current of said second frequency for operating said second relay, a signal circuit, means responsive to the operation of said second relay following the operation of said first relay for closing said circuit, means responsive to the operation of said first relay following the operation of said second relay for opening said circuit, and means effective in response to the operation of said first relay for decreasing the sensitivity of said second relay and maintaining said decreased sensitivity for a predetermined interval after said first relay releases.

18. In a signaling system, a signal receiver adapted to respond to signals consisting of current of a first voice frequency followed by current of a second voice frequency and to signals consisting of current of said second frequency followed by current of said first frequency, a first relay, means responsive only to current of said first frequency for operating said first relay, a second relay, means responsive only to current of said second frequency for operating said second relay, a signal circuit, means responsive to the operation of said second relay following the operation of said first relay for closing said circuit, means responsive to the operation of said first relay following the operation of said second relay for opening said circuit, and means effective in response to the operation of said second relay for decreasing the sensitivity of said second relay and maintaining said decreased sensitivity for a predetermined interval after said second relay releases.

19. In a signaling system, a two-way trunk line, means at each end of said line for seizing the line on an out-going call, a signal receiver and signal transmitter individually associated with each end of said line, the transmitter at one end of said line adapted to transmit and the receiver at the other end adapted to respond to signals consisting of current of a first voice frequency followed by current of a second voice frequency and signals consisting of current of said second frequency followed by current of said first frequency, the transmitter at said other end of said line adapted to transmit and the receiver at said one end adapted to respond to signals consisting of current of a third voice frequency followed by current of a fourth voice frequency and signals consisting of current of said fourth frequency followed by current of said third frequency, each of said receivers comprising a first relay, means responsive only to current of one of the two frequencies used for signals incoming to the receiver for operating said first relay, a second relay, means responsive only to current of the other of the two frequencies used for signals incoming to the receiver for operating said second relay, a first signal circuit at each end of said line, a second signal circuit at each end of said line, means at each end of said line for controlling the associated transmitter to send seizure, dial impulse, ringing, and disconnect signals over said line on outgoing calls, means at each end of said line for controlling the associated transmitter to send answering supervisory, ringing and busy signals over said line on incoming calls, means in each of said receivers for marking said trunk busy and for closing said first one of the associated signal circuits in response to the initial operation of said first relay of the receiver on an incoming call without waiting for the operation of the second relay of the receiver, means in each of said receivers effective after the closing of the associated first one of said signal circuits on an incoming call to open said first signal circuit only in response to the operation of said first relay of the receiver within a predetermined interval of time following an operation of said second relay of the receiver.

20. In a signaling system according to claim 19, means at each end of said line for marking said line busy upon seizure on an outgoing call and for rendering the receiver at the seized end effective to close the second of the associated signal circuits only in response to an operation of said second relay of the receiver following an operation of said first relay.

21. In a signaling system, a two-way trunk line, a signal receiver associated with one end of said line and adapted to respond to signals incoming over said line on calls in either direction, said signals consisting of current of either one of two signaling frequencies followed by current of the other of the signaling frequencies, means at said end of said line for seizing said line on an outgoing call, a signal transmitter at said line of said line for transmitting signals over said line on calls in either direction, said receiver comprising a first relay, means for operating said first relay only in response to current of a first one of said frequencies, a second relay, and means for operating said second relay only in response to current of the second of said frequencies, a signal circuit controlled by said receiver on an incoming call, a signal circuit controlled by said receiver on an outgoing call, means for closing the first-mentioned signal circuit in response to an initial operation of said first relay on an incoming call without waiting for an operation of said second relay, means rendered effective upon operation of said transmitter to send a seizure signal over said line to enable the closure of said second signal circuit only in response to the operation of said second relay within a predetermined interval of time after an operation of said first relay.

22. In a signaling system, a two-way trunk line, a signal receiver associated with one end of said line and adapted to respond to signals incoming over said line on calls in either direction, said signals consisting of current of either one of two signaling frequencies followed by current of the other of the signaling frequencies, means at said end of said line for seizing said line on an outgoing call, a signal transmitter at said end of said line for transmitting signals over said line on calls in either direction, said receiver comprising a first relay, means for operating said first relay only in response to current of a first one of said frequencies, a second relay, and means for operating said second relay only in response to current of the second of said frequencies, a signal conductor, means for closing a circuit over said conductor in response to the initial operation of said first relay on an incoming call without waiting for an operation of said second relay, and means for preventing the closure of a circuit over said conductor in response to the initial operation of said first relay on an outgoing call.

23. In a signaling system, a two-way trunk line, a signal receiver associated with one end of said line and adapted to respond to signals incoming over said line on calls in either direction, said signals consisting of current of either one of two signaling frequencies followed by current of the other of the signaling frequencies, means at said end of said line for seizing said line on an outgoing call, a signal transmitter at said end of said line for transmitting signals over said line on calls in either direction, said receiver comprising a first relay, means for operating said first relay only in response to current of a first one of said frequencies, a second relay, and means for operating said second relay only in response to current of the second of said frequencies, a signal conductor, means for closing a circuit over said conductor in response to the initial operation of said first relay on an incoming call without waiting for on operation of said second relay, means for preventing the closure of a circuit over said conductor in response to the initial operation of said first relay on an outgoing call, and means for closing a circuit over said conductor on an outgoing call in response to the operation of said second relay within a predetermined interval of time after the operation of said first relay.

24. In a signal receiver according to claim 13, means for maintaining the closure of said circuit while neither of said first and second relays is operated.

25. In a signal receiver according to claim 14, means for maintaining the closure of said circuit while both of said first and second relays are normal.

26. In a signal receiver according to claim 14, a fourth relay, said fourth relay having a contact for maintaining the closure of said circuit while neither of said first and second relays is operated, and means for operating said fourth relay whenever either one of said first and second relays is operated.

27. A signal receiver adapted to respond to signals consisting of current of either one of two signaling frequencies followed by current of the other of the two frequencies, means responsive only to current of a first one of said frequencies for operating said first relay, a second relay, means responsive only to current of the second of said frequencies for operating said second relay, a signal circuit, means comprising a third relay responsive to an operation of said first relay for closing said circuit and for maintaining the closure of said circuit after said first relay releases, means responsive to an operation of said second relay followed by an operation of said first relay for opening said circuit, and means effective while neither one of said first and second relays is operated for maintaining the closure of said circuit.

28. The method of preventing signal distortion and signal failures in a communication system in which signals are transmitted by a sequence of impulses of current of different frequencies by passing to each of two signaling branches current of only one of the signaling frequencies, and limiting the current in each branch to a predetermined value independent of variations in the level of the current impulses.

29. A signal receiver adapted to respond to signals consisting of current of either one of two signaling frequencies followed by current of the other of said frequencies, a first signal relay, said first relay for responding only to current of a first one of said frequencies, a second signal relay, said second relay for responding only to current of the second of said frequencies, means comprising a band-pass filter tuned to said first frequency and a volume limiting amplifier in series in the order named for applying signaling energy of said first frequency to said first relay, and a band-pass filter tuned to said second frequency and a volume limiting amplifier in series in the order named for applying signaling energy of said second frequency to said second relay.

30. A signal receiver according to claim 29, said volume limiting amplifiers being of the slow-recovery type, so as to prevent echoes of the first signaling frequency from interfering with response to the signal.

EDMUND R. TAYLOR.